(12) United States Patent
Morita et al.

(10) Patent No.: US 8,215,018 B2
(45) Date of Patent: Jul. 10, 2012

(54) METHOD FOR MANUFACTURING LIQUID DISCHARGE HEAD

(75) Inventors: Osamu Morita, Yokosuka (JP); Kiyomitsu Kudo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 12/753,725

(22) Filed: Apr. 2, 2010

(65) Prior Publication Data

US 2010/0257736 A1 Oct. 14, 2010

(30) Foreign Application Priority Data

Apr. 8, 2009 (JP) ................. 2009-094103
Apr. 8, 2009 (JP) ................. 2009-094104

(51) Int. Cl.
*B21D 53/76* (2006.01)
(52) U.S. Cl. ............... 29/890.1; 29/890.14; 29/890.142; 29/830; 29/831; 29/852
(58) Field of Classification Search ................. 29/890.1, 29/890.14, 890.142, 830, 831, 832, 852; 347/40, 92, 93, 47, 71, 68, 61, 65; 216/27, 216/58, 57, 32; 438/349, 112, 355, 358, 438/503
See application file for complete search history.

(56) References Cited

U.S. PATENT DOCUMENTS

| | | | |
|---|---|---|---|
| 6,935,723 B2 * | 8/2005 | Murakami et al. | 347/40 |
| 7,261,397 B2 * | 8/2007 | Morita | 347/84 |
| 2002/0033858 A1 * | 3/2002 | Miyazaki et al. | 347/20 |
| 2004/0021744 A1 * | 2/2004 | Murakami et al. | 347/65 |
| 2007/0128818 A1 * | 6/2007 | Yang et al. | 438/349 |

FOREIGN PATENT DOCUMENTS

JP 2005-096422 4/2005

* cited by examiner

*Primary Examiner* — David Bryant
*Assistant Examiner* — Tai Nguyen
(74) *Attorney, Agent, or Firm* — Canon USA Inc IP Division

(57) ABSTRACT

There is provided a method for manufacturing a liquid discharge head that includes a discharge port, a supply path for supplying the liquid to the discharge port, a transparent member, and an absorptive member, wherein the transparent member and the absorptive member include supply path sections that become a part of a wall of the supply path. The method includes bringing the transparent and absorptive member into contact with each other in such a manner that surfaces of both members including the supply path sections are brought into contact with each other in the vicinity of the supply path sections, welding the both members by irradiating the contact portion where the both members are in contact with each other with the laser beam, and exhausting gas from an exhaust path formed on the liquid discharge head in the vicinity of the contact portion at least throughout the welding process.

11 Claims, 32 Drawing Sheets

METHOD FOR MANUFACTURING LIQUID DISCHARGE HEAD

BACKGROUND OF THE INVENTION

1. Field of the Invention

The present invention relates to a liquid discharge head for discharging liquid, such as ink, to perform a recording operation onto a recording medium, and more particularly to a method for manufacturing a liquid discharge head performing an ink jet recording.

2. Description of the Related Art

An ink jet recording head has generally been known as one of liquid discharge heads. The structure of the ink jet recording head will briefly be described with reference to FIGS. 12A to 12C.

As illustrated in FIG. 12A, an ink jet recording head 1000 includes a tank holder unit 1500, and a recording element unit 1400 for discharging ink. The ink is guided to the recording element unit 1400 from an ink tank (not illustrated) through an ink supply path formed in the tank holder unit 1500 made of a resin material.

A tank holder 1520 that is formed integral with a part of a wall of the ink supply path illustrated in FIG. 12B and a supply path member 1510 that is formed integral with a part of a wall of the ink supply path illustrated in FIG. 12C are bonded to form an ink supply path 1600 (FIG. 13C).

As a method for forming the ink supply path 1600 by bonding the tank holder 1520 and the supply path member 1510, there has been known a method by a laser welding discussed in Japanese Patent Application Laid-Open No. 2005-096422. The laser welding method is as described below. More specifically, a resin material which has light transmittance to a laser beam and a resin material which has absorptivity to a laser beam are brought into contact with each other. In this state, a laser beam is irradiated to a portion to be welded, so that the resin materials are bonded to each other.

A method for bonding the tank holder 1520 and the supply path member 1510 using the laser welding discussed in Japanese Patent Application Laid-Open No. 2005-096422 will be described with reference to FIGS. 13A and 13B.

Firstly, the tank holder 1520 which has light transmittance to a laser beam and the supply path member 1510 which has absorptivity to a laser beam are brought into contact with each other (FIG. 13A). In this state, a laser beam is irradiated from a laser beam irradiation lens 110 to the tank holder 1520 and the supply path member 1510 (FIG. 13B) to form the ink supply path 1600 (FIG. 13C).

FIG. 13C illustrates an enlarged welded portion in FIG. 13B. In the method for forming the ink supply path by the laser welding, the welded portion 1630 becomes high temperature to fuse the resin. In a welding process, gas G is generated from the welded portion 1630 around the ink supply path 1600 (1600S in FIGS. 12B and 12C) as illustrated in FIG. 13C, so that the gas G might leak to the outside through the ink supply path 1600.

When the gas generated upon the welding reaches the irradiation lens 110 of a laser beam irradiation device 100, the irradiation lens 110 is contaminated which might reduce an irradiation amount of the laser beam.

SUMMARY OF THE INVENTION

The present invention is directed to reduce contamination of an irradiation lens due to gas generated from a welded portion in a method for manufacturing a liquid discharge head in which an ink supply path is formed by welding resin materials by irradiation with a laser beam.

According to an aspect of the present invention, there is provided a method for manufacturing a liquid discharge head which includes a discharge port for discharging liquid, and a supply path for supplying the liquid to the discharge port, wherein the liquid discharge head includes a transparent member that has light transmittance for a laser beam, and an absorptive member that has absorptivity to the laser beam, and the transparent member and the absorptive member include a supply path section that becomes a part of a wall of the supply path. The method includes bringing the transparent member and the absorptive member into contact with each other in such a manner that a surface of the transparent member including the supply path section and a surface of the absorptive member including the supply path section are brought into contact with each other in the vicinity of the supply path section, welding the transparent member and the absorptive member by irradiating the contact portion where both members are in contact with each other with the laser beam via the transparent member, and exhausting gas from an exhaust path formed on the liquid discharge head in the vicinity of the contact portion at least throughout the welding process.

According to the present invention, reduction in an irradiation amount of a laser beam can be prevented by reducing contamination of an irradiation lens. Accordingly, the present invention can provide a method for manufacturing a liquid discharge head in which an ink supply path can be formed by stable irradiation with a laser beam.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A basic structure of an exemplary embodiment involved with an ink jet recording head (hereinafter referred to as a recording head) as a liquid discharge head according to the present invention will be described below.

The structure of the ink jet recording head (hereinafter referred to as a recording head) as a liquid discharge head will be described with reference to FIGS. 6A to 6C.

Figure 6A:
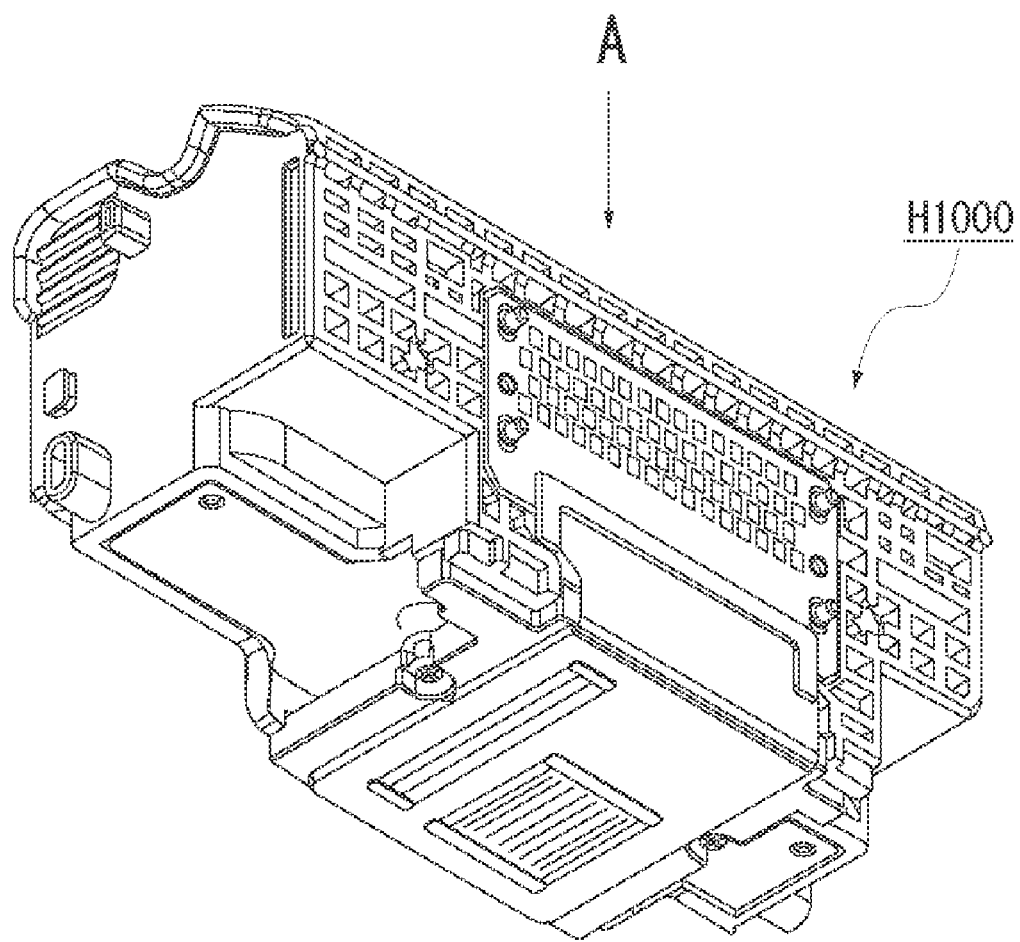
FIGS. 6A to 6C illustrate an ink jet recording head according to the exemplary embodiments of the present invention.
Figure 6B:
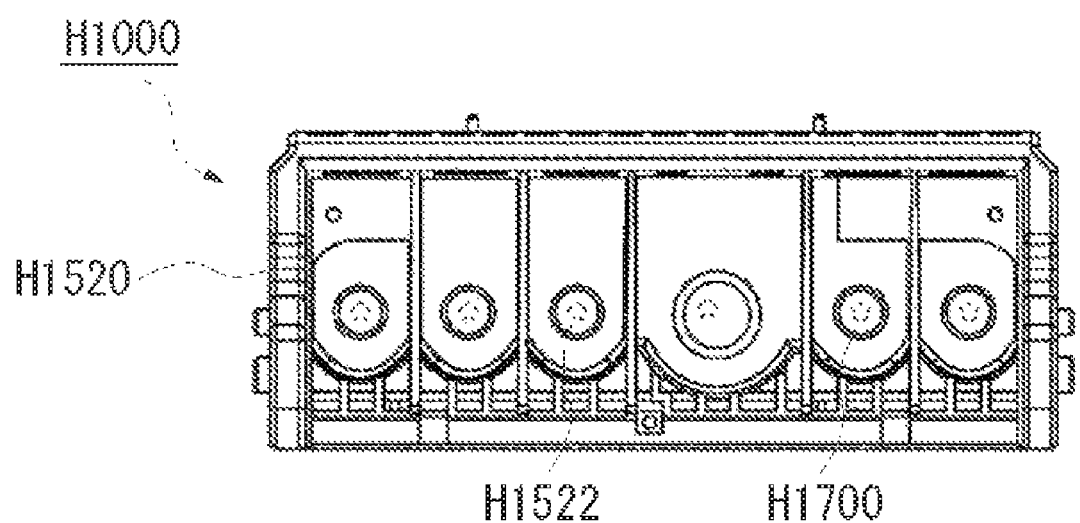

FIG. 6A is a schematic perspective view illustrating one example of the recording head. FIG. 6B is a schematic view of the recording head in FIG. 6A viewed from an arrow A. FIG. 6C is an exploded perspective view illustrating the structure of the recording head in FIG. 6A.

A recording head H1000 includes a recording element unit H1400, and a tank holder unit H1500 that holds a tank storing ink for supplying the ink from the tank to the recording element unit H1400.

A recording element substrate H1100 and a wiring member H1300 constituting the recording element unit will be described in detail. The structure of the recording element substrate H1100 will be described with reference to FIG. 7.

Figure 7:
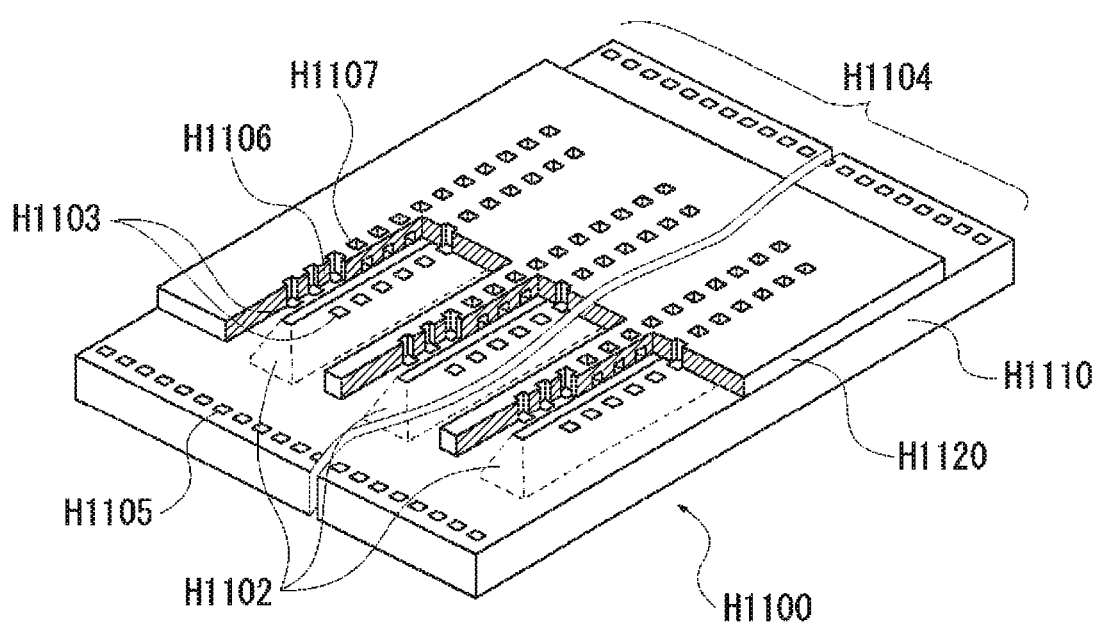
FIG. 7 illustrates a recording element substrate.

FIG. 7 is a partial cutaway perspective view for describing the structure of the recording element substrate H1100. The recording element substrate H1100 includes a silicon substrate H1110 having a thickness of 0.5 mm to 1 mm, and a discharge port forming member H1120 for forming a flow path wall H1106 for forming an ink flow path and a discharge port H1107.

On the silicon substrate H1110, an ink supply port H1102, which is a through-hole for supplying ink, is formed by anisotropic etching. Recording elements H1103 are provided at both sides of the ink supply port H1102 along the ink supply port H1102. A heating resistance element or piezoelectric element may be provided as the recording element, for example. The case in which the heating resistance element such as a heater is used as the recording element will be described below.

The silicon substrate H1110 is made of aluminum, and has provided thereon an electric wiring (not illustrated) for supplying power to the recording elements H1103 with a predetermined distance from the ink supply port H1102. The recording elements H1103 and the electric wiring can be formed utilizing a conventional film-forming technique (e.g., photolithographic technique).

The silicon substrate H1110 is further provided with an electrode section H1104 including a plurality of connection terminals H1105 for supplying power to the electric wiring or supplying an electric signal for driving the recording elements H1103. The electrode section H1104 is provided along a side at both ends of the row of the recording elements. The connection terminal H1105 is formed from a bump made of, for example, Au.

The discharge port forming member H1120 is formed on a surface of the silicon substrate H1110 by a photolithographic technique. Ink flow paths are formed on the discharge port forming member H1120 to correspond to the recording elements H1103. The discharge port forming member H1120 includes ink flow path walls H1106 that separate the respective ink flow paths, and a ceiling that cover the ink flow path walls. A discharge port H1107 is formed to the ceiling section. Each of the discharge ports H1107 is provided to face each of the recording elements H1103. A plurality of discharge ports H1107 are arranged to form a discharge port row.

In the recording element substrate H1100 thus configured, the ink supplied from the ink supply port H1102 is discharged from the discharge ports H1107 facing the corresponding recording elements H1103 by the pressure of air bubbles generated by heat generation of the respective recording elements H1103.

Figure 6C:
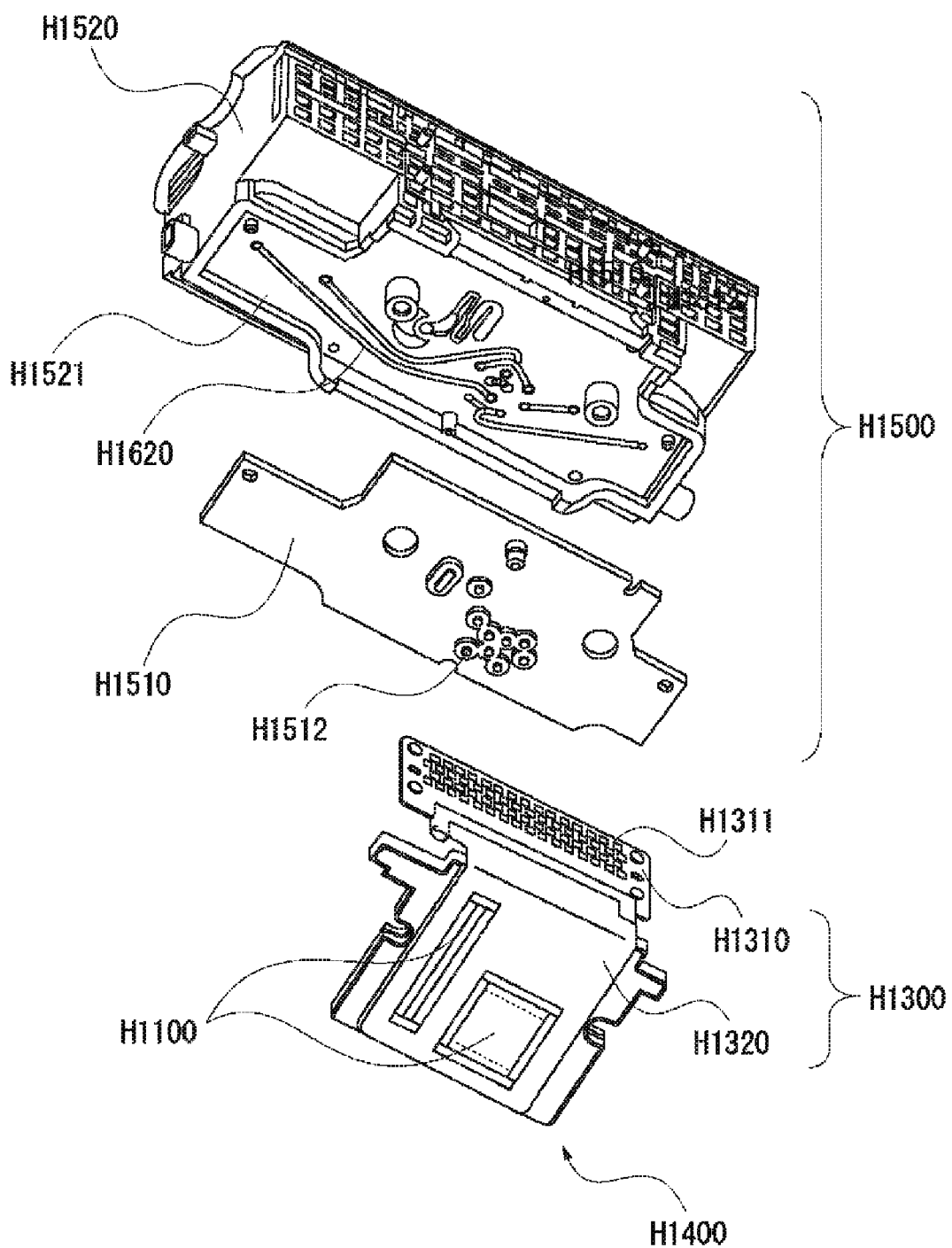

As illustrated in FIG. 6C, the wiring member H1300 includes a rigid wiring substrate H1310 provided with a connection terminal H1311 for electrically connecting the recording head to the recording apparatus, and a flexible wiring substrate H1320 that is electrically connected to the recording element substrate H1100. When the flexible wiring substrate H1320 is bent along a surface of the recording head H1000, the connection terminal H1311 formed on the different surfaces of the recording head H1000 and the recording element substrate H1100 are electrically connected.

An electric signal or power is transmitted from the recording apparatus to the recording element substrate H1100 via the wiring member H1300 to drive the recording elements H1300 provided on the recording element substrate H1100. More specifically, the electrode section H1104 formed on an end portion of the surface of the recording element substrate H1100 and a lead terminal extending from an opening of the flexible wiring substrate H1320 are connected with each other by an electrical connecting unit, such as wire bonding. This electrical connection portion is sealed by a sealing member to prevent the corrosion by ink and damage by external force.

The recording head H1000 drives the recording elements according to an electric signal transmitted from the recording apparatus, and discharges ink which is supplied from the tank (not illustrated) storing the ink from the discharge ports provided on the recording element substrate H1100.

The tank holder unit H1500 has a first supply path member H1510 and the tank holder H1520 formed integral with a second supply path member H1521 as illustrated in FIG. 6C. The first supply path member H1510 is formed with a first supply path section H1610 (see FIG. 1A) that constitutes a part of the wall of the ink supply path, while the second supply path member H1521 is formed with a second supply path section H1620 that constitutes a part of the wall of the ink supply path.

The first supply path member H1510 and the second supply path member H1521 are bonded with the first supply path section H1610 and the second supply path section H1620 facing inward, so that the ink supply path is formed between the first supply path member H1510 and the second supply path member H1521. The ink is supplied from the tank to the recording element substrate H1100 through the ink supply path. Since the first supply path member H1510 and the second supply path member H1521 are bonded to form the ink supply path, a groove for forming the ink supply path may appropriately be formed on either one or both of the first and second supply path members.

A first opening H1512 (see FIGS. 1A and 6C) that communicates with the ink supply path is formed on a surface of the first supply path member H1521 on a side where the laser beam is irradiated. The ink supply path communicates with the ink supply port H1102 formed on the recording element substrate H1100 via the first opening H1512. A second opening H1522 (see FIG. 6B) that communicates with the ink supply path is formed on a back surface of the second supply path member which is opposite to the surface on the side where the laser beam is irradiated. In FIG. 6B, the second opening H1522 is represented by a dotted line when the recording head H1000 is viewed through a filter H1700. The ink supply path communicates with the tank via the second opening H1522 and the filter H1700.

It is necessary that one of the first supply path member H1510 and the second supply path member H1521 has light transmittance to the laser beam, and the other has absorptivity to the laser beam, to weld the first supply path member H1510 and the second supply path member H1521 with the laser beam. In the exemplary embodiment of the present invention, a transparent member having light transmittance to the laser beam is defined as the first supply path member H1510, while an absorptive member having absorptivity to the laser beam is defined as the second supply path member H1521 from the viewpoint of easily irradiating the welded portion with the laser beam. The determination as to which supply path member has light transmittance, and which member has absorptivity, can appropriately be changed.

In the present invention, the transparent member having light transmittance to the laser beam means a member which has 30% or more of light transmittance when the member having a thickness of 2.0 mm is irradiated with the laser beam. In the present invention, the absorptive member having absorptivity to the laser beam means a member which has 90% or more of absorptivity when the member having a thickness of 2.0 mm is irradiated with the laser beam. Since the members having the transmittance and absorptivity described above are used, the transparent member and the absorptive member can be welded by means of the laser beam.

In the present exemplary embodiment, the second supply path member H1521 is formed integral with the tank holder H1520. However, the second supply path member H1521 may be formed separately from the tank holder H1521. In this case, after the second supply path member H1521 and the first supply path member H1510 are welded by a method described in the exemplary embodiment below to form the supply path member, the supply path member is attached to the tank holder.

The specific exemplary embodiment of the present invention will be described in detail below with reference to the drawings.

A first exemplary embodiment of the present invention will be described in detail with reference to the drawings.

Figure 1A:
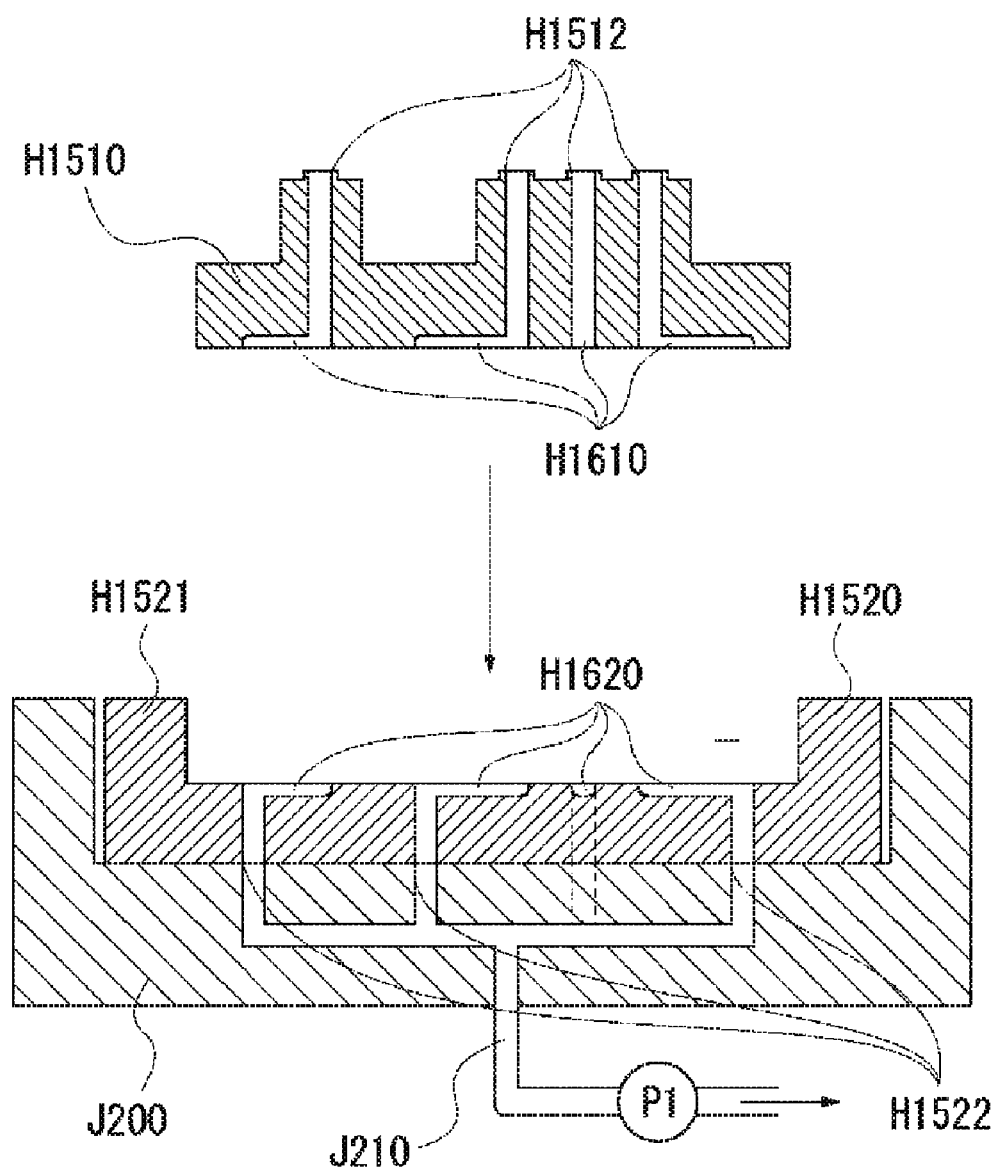
FIGS. 1A and 1B illustrate a first exemplary embodiment of the present invention.
Figure 1B:
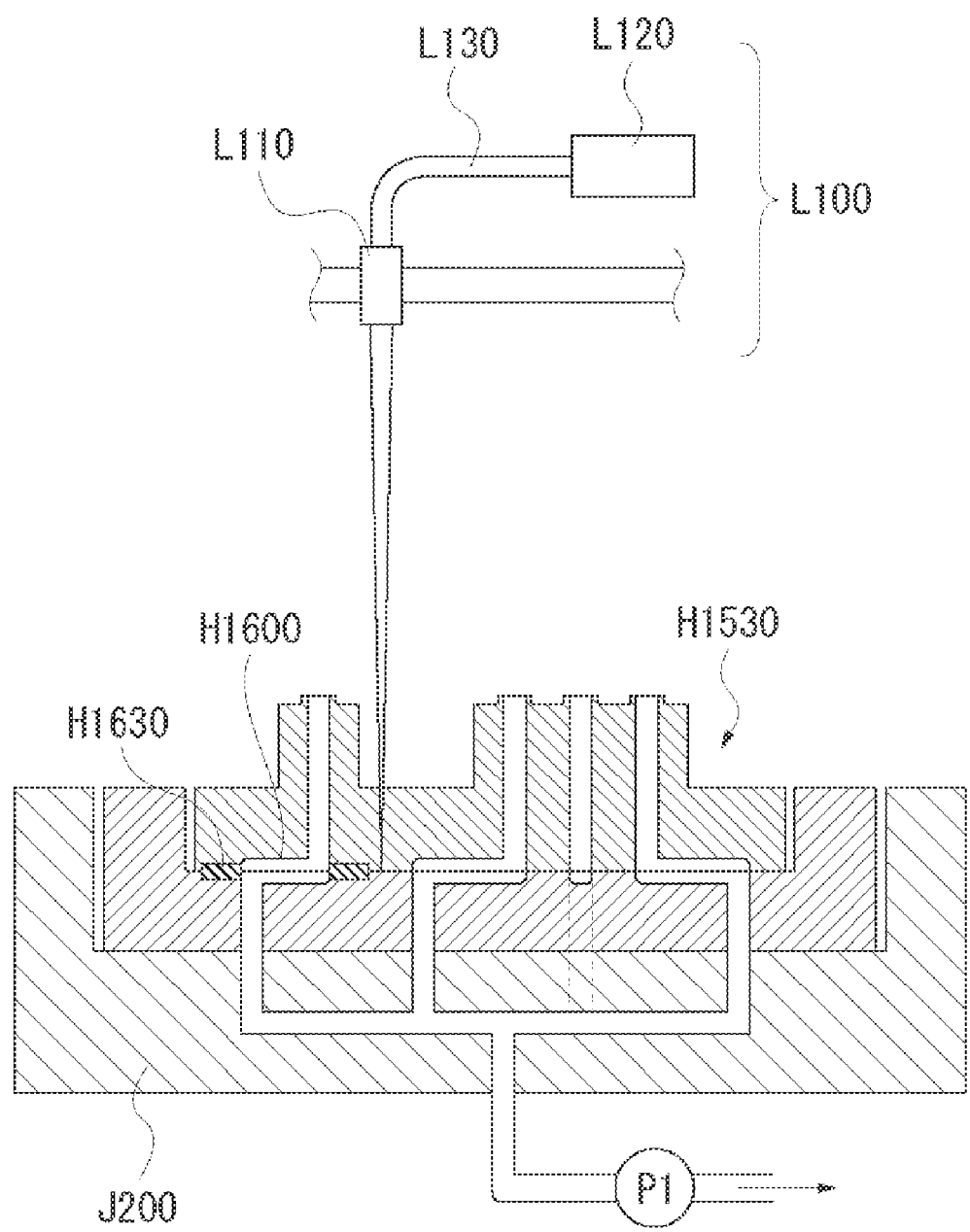

FIGS. 1A and 1B are cross sectional views illustrating a process of forming an ink supply path H1600 by welding the first supply path member H1510 provided with the first supply path section H1610 and the second supply path member H1521 (tank holder H1520) provided with the second supply path section H1620.

FIG. 1A illustrates a process of bringing the first supply path member 1510 serving as the transparent member and the second supply path member H1521 serving as the absorptive member into contact with each other with the first supply path section and the second supply path section facing inward. In this process, the first supply path member H1510 and the second supply path member H1521 are brought into contact with each other in such a manner that the surface of the first supply path member including the supply path section and the surface of the second supply path member including the supply path section are brought into contact with each other in the vicinity of the first supply path section and the second supply path section. In this case, the first supply path section and the second supply path section are enclosed by a contact portion where the first supply path member H1510 and the second supply path member H1521 are in contact with each other. As illustrated in FIG. 1A, the tank holder H1520 with which the second supply path member H1521 is formed integral is arranged on a rack J200, and then, the first supply path member H1510 is arranged on the second supply path member H1521.

A laser beam irradiation device L100 includes a laser beam irradiation lens L110, a laser beam source L120, and a fiber L130 that transmits the laser beam from the laser beam source L120 to the irradiation lens L110.

An exhaust pipe J210 is provided to the rack J200 in order that gas in the ink supply path H1600 can be exhausted from the second opening formed on the second supply path member. The exhaust pipe J210 is connected to a pump P1 via an on/off valve (not illustrated).

FIG. 1B illustrates a welding process using the laser beam irradiation. As illustrated in FIG. 1B, the laser beam is emitted from the laser beam irradiation lens L110 to an area around the ink supply path H1600, where the contact portion between the first supply path member and the second supply path member is present, via the first supply path member H1510. With this process, a welded portion H1630 is formed at the portion irradiated with the laser beam, so that the first supply path member and the second supply path member are bonded to form a supply path member H1530.

The on/off valve connected to the operated pump P1 is opened to communicate the exhaust pipe J210 with the pump P1 to prevent the gas generated from the welded portion H1630 during the welding process illustrated in FIG. 1B from being exhausted to the outside from the first opening H1512. The gas in the ink supply path H1600 is sucked by the pump P1, and exhausted. More specifically, the ink supply path H1600 is used as an exhaust path for the gas during the welding process. Incidentally, the gas generated from the welded portion may be exhausted using the pump P1 after the welding process.

With this process, an atmospheric pressure in the second opening H1522 becomes lower than an atmospheric pressure in the first opening H1512. Therefore, airflow is generated in the ink supply path H1600 from the first opening to the second opening. Thus, the gas generated from the welded portion H1630 can be exhausted during the welding process. In the state where the airflow is generated from the first opening to the second opening, the atmospheric pressure at the first opening H1512 is lower than that around the irradiation lens L110. Accordingly, the gas generated from the welded portion H1630 can be prevented from leaking from the first opening H1521 to direct toward the irradiation lens L110.

As described above, the portion that is to be the ink supply path H1600 is formed on the first supply path member H1510 and the second supply path member H1521, and this portion, which has already been formed, is used as the exhaust path of the gas. Accordingly, the gas can be exhausted during the welding process.

The generated gas can be rapidly exhausted from the ink supply path H1600 when the process of exhausting the gas in the ink supply path H1600 via the exhaust pipe J210 using the pump P1 is performed during the welding process in which the gas is generated from the welded portion H1630, compared to the case where the process described above is performed after the welding process. When the gas in the ink supply path H1600 is exhausted throughout the welding process, and the exhaust of the gas is completed after the welding process, the gas that is generated from the welded portion H1630 and that remains in the ink supply path H1600 can efficiently be exhausted from the second opening H1522. Further, when the gas in the ink supply path H1600 is started to be exhausted from the contact process, i.e., before the welding process, the gas generated from the welded portion H1630 can more efficiently be exhausted from the second opening H1522.

When the exhaust of the gas is started before the gas is generated from the welded portion, air, which originally exists before the welding process, is also exhausted in addition to the gas generated from the welded portion H1630 during the welding process. There may be the case in which the process of bringing the first supply path member H1510 and the second supply path member H1521 into contact with each other and the welding process are repeated to manufacture a plurality of recording heads. In this case, the gas is exhausted during the process of bringing both supply path members into contact with each other, and the welding process and after the welding process, so that the gas generated from the welded portion H1630 is exhausted from the second opening H1522. Therefore, the recording head can efficiently be manufactured.

As described above, the gas in the ink supply path is exhausted from the second opening of the absorptive member which is located at the side opposite to the irradiation lens at least throughout the welding process, so that the gas generated from the welded portion can be prevented from directing toward the irradiation lens from the first opening. Therefore, the contamination of the irradiation lens can be reduced and the attenuation of the irradiation energy of the laser beam can be suppressed. More specifically, according to the manufacturing method according to the exemplary embodiment of the present invention, deterioration in performance of the laser beam irradiation device can be prevented, and a recording head provided with an ink supply path having high reliability can be manufactured through the stable irradiation with the laser beam.

When the recording head is mass produced, the contamination of the irradiation lens can be reduced according to the present invention, so that the number of times of cleaning irradiation lens can be reduced and a high productivity can be realized.

In the present exemplary embodiment, a transparent Noryl resin "model No. TPN9221" (manufactured by SABIC Innovative Plastics <former GE Plastics>) is used as the material for the transparent member. The transparent Noryl has a property of transmitting the laser beam, and has an excellent ink resistance. A transparent Noryl resin "model number TN300" (manufactured by the above company) not containing a color material may also be used as the material for the transparent member.

The Noryl is a popular name of modified polyphenylene ether or modified polyphenylene oxide. The Noryl is the one formed by modifying polyphenylene ether (polyphenylene oxide) to increase heat resistance and strength. It belongs to a thermoplastic resin, and has a strong resistance to acid and alkali.

A black Noryl "model No. SE1X" (manufactured by the above company) containing dye or pigment absorbing the laser beam is used for the material of the absorptive member.

A second exemplary embodiment according to the present invention will next be described.

In the second exemplary embodiment, a processed area by the laser welding is covered by a cover C300. The components similar to those in the first exemplary embodiment are identified by the same numerals and description thereof is omitted. The second exemplary embodiment is different from the first exemplary embodiment in that the exhaust pipe J210 provided on the rack J200 is not connected to the pump P1.

Figure 2A:
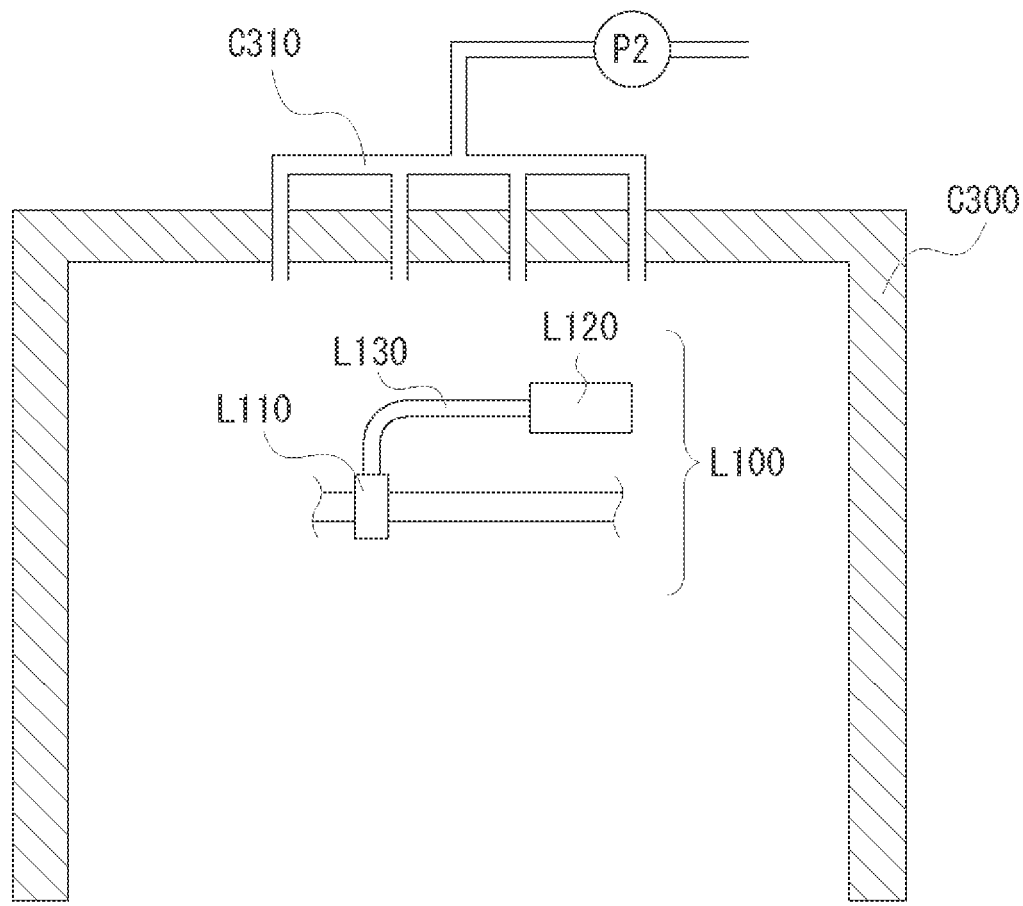
FIGS. 2A and 2B illustrate a second exemplary embodiment of the present invention.
Figure 2A:
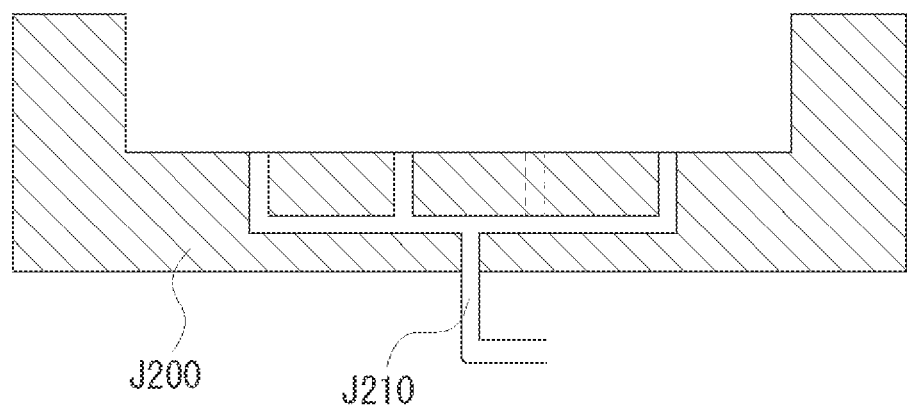

In the second exemplary embodiment, the laser beam irradiation device L100 is covered by the cover C300 as illustrated in FIG. 2A. However, so long as at least the irradiation lens L110 is arranged in the cover C300, the laser beam source L120 and the fiber L130 may be arranged at the outside of the cover C300.

With the condition in which the processed area by the laser welding, including the laser irradiation lens L110, is covered by the cover C300, an air inlet portion C310 that is connected to the pump P2 via an on/off valve (not illustrated) is provided to the cover C300 in such a manner that the irradiation lens L110 is located at the upstream side of the airflow. Gas can be introduced from the air inlet portion C310 into the cover C300.

Figure 2B:
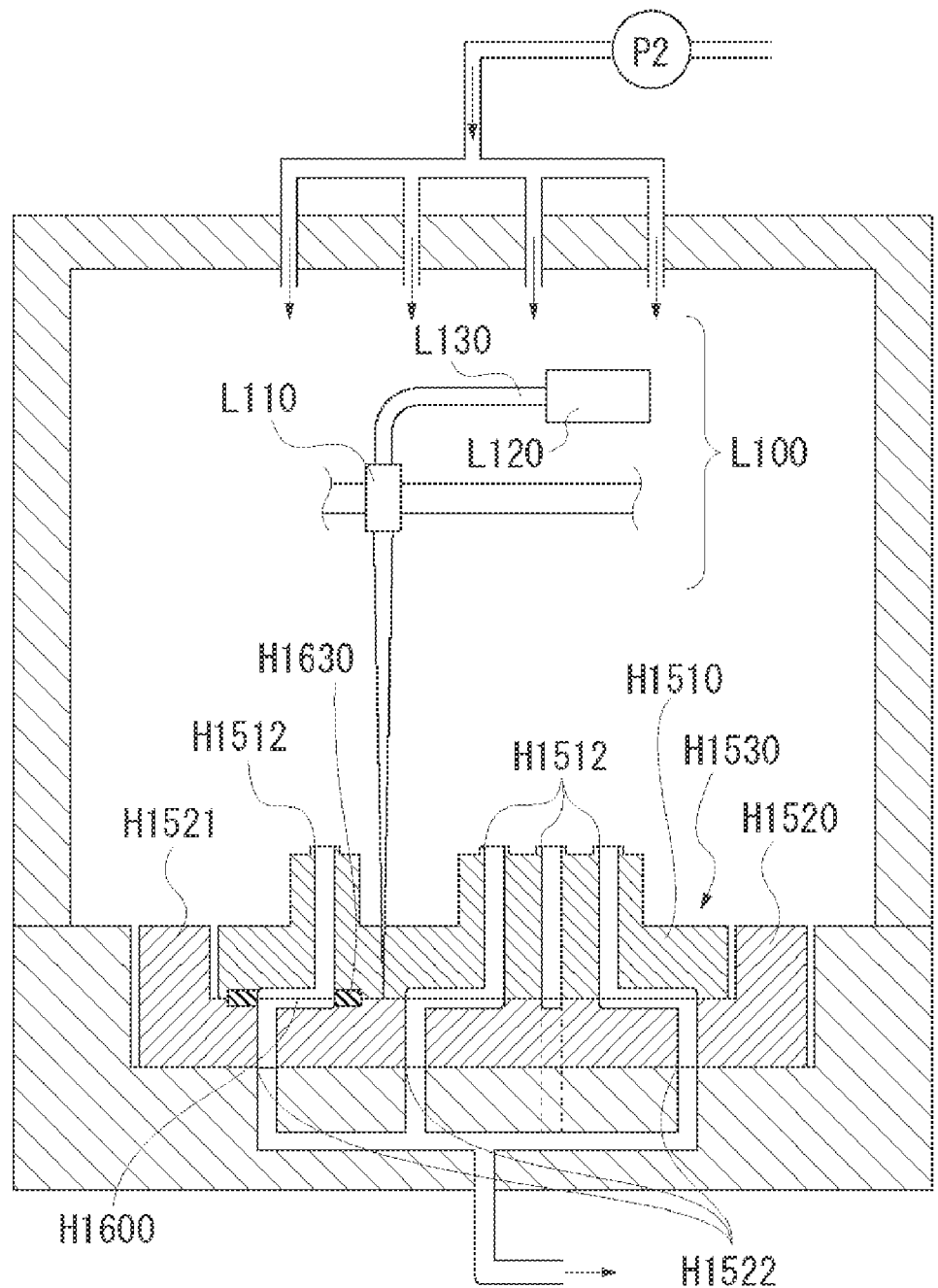

FIG. 2B illustrates the welding process of emitting a laser beam. The cover C300 moves toward the rack J200 together with the laser beam irradiation device L100, so that the cover C300 is brought into contact with the rack J200 to cover the first supply path member H1510 and the second supply path member H1521 which are the subject to be welded. Like the case in the first exemplary embodiment, a laser beam is emitted from the laser beam irradiation lens L110 of the laser beam irradiation device L100 to an area H1600S around the ink supply path.

During the welding process illustrated in FIG. 2B, gas is introduced into the cover C300 from the air inlet portion C310 with using the pump P2. Since the process of introducing gas is performed during the welding process, the atmospheric pressure in the first opening becomes higher than the atmospheric pressure in the second opening. Therefore, the gas generated from the welded portion H1630 present in the ink supply path H1600 can be exhausted from the second opening H1522 that communicates with the outside of the cover C300.

With this structure, the atmospheric pressure in the irradiation lens L110 and the first opening H1512 can be made higher than the atmospheric pressure in the second opening H1522, therefore the airflow can be produced from the first opening H1512 toward the second opening H1522. Since the second opening H1522 communicates with the outside of the cover C300 via the exhaust pipe J210, the atmospheric pressure in the second opening H1522 is higher than the ambient atmospheric pressure with the airflow being produced from the first opening toward the second opening. Accordingly, the gas generated from the welded portion H1630 can be prevented from leaking out from the first opening H1512 to direct toward the irradiation lens L110.

As described above, the portion that becomes the ink supply path H1600 is formed on the first supply path member H1510 and the second supply path member H1521, and this portion that has already been formed is used as the gas exhaust path. Therefore, the gas can be exhausted throughout the welding process.

The irradiation lens L110 is arranged on the side of the air inlet portion C310 which is the upstream side of the airflow. Therefore, even if the gas generated from the welded portion H1630 leaks out from the first opening H1512, this gas can be prevented from directing toward the irradiation lens L110.

The gas that gives less adverse effect on the irradiation lens L110, i.e., that hardly contaminates the irradiation lens L110, may be used as the gas introduced from the air inlet portion C310. Examples of such gas may include inert gas such as nitrogen. If the ambient air of the cover C300 is not contaminated, the ambient air may be introduced from the air inlet portion C310.

The gas may be introduced from the gas inlet portion C310 into the cover C300 at least throughout the welding process. When the gas is continuously introduced from the air inlet portion C310 into the cover C300 even after the welding process, the airflow from the air inlet portion C310 toward the rack J200 can be produced around the irradiation lens L110. Accordingly, even if the cover C300 is separated from the rack J200 by which the cover C300 is opened, this structure can prevent the gas generated from the welded portion H1630 from directing toward the irradiation lens L110 from the first opening H1512.

When the process of introducing the gas is performed before the process of bringing the members into contact with each other, i.e., before the welding process, and throughout the welding process, the contamination of the irradiation lens L110 by the gas generated from the welded portion H1630 can further be reduced. Like the case in the first exemplary embodiment, there may be the case in which the process of bringing the first supply path member H1510 and the second supply path member H1521 into contact with each other and the welding process are repeated to manufacture a plurality of recording heads. In this case, the gas is exhausted during the process of bringing both supply path members into contact with each other, and the welding process and after the welding process, so that the gas generated from the welded portion H1630 can be prevented from directing toward the irradiation lens L110 from the first opening. Therefore, the recording head can efficiently be manufactured.

Figure 3A:
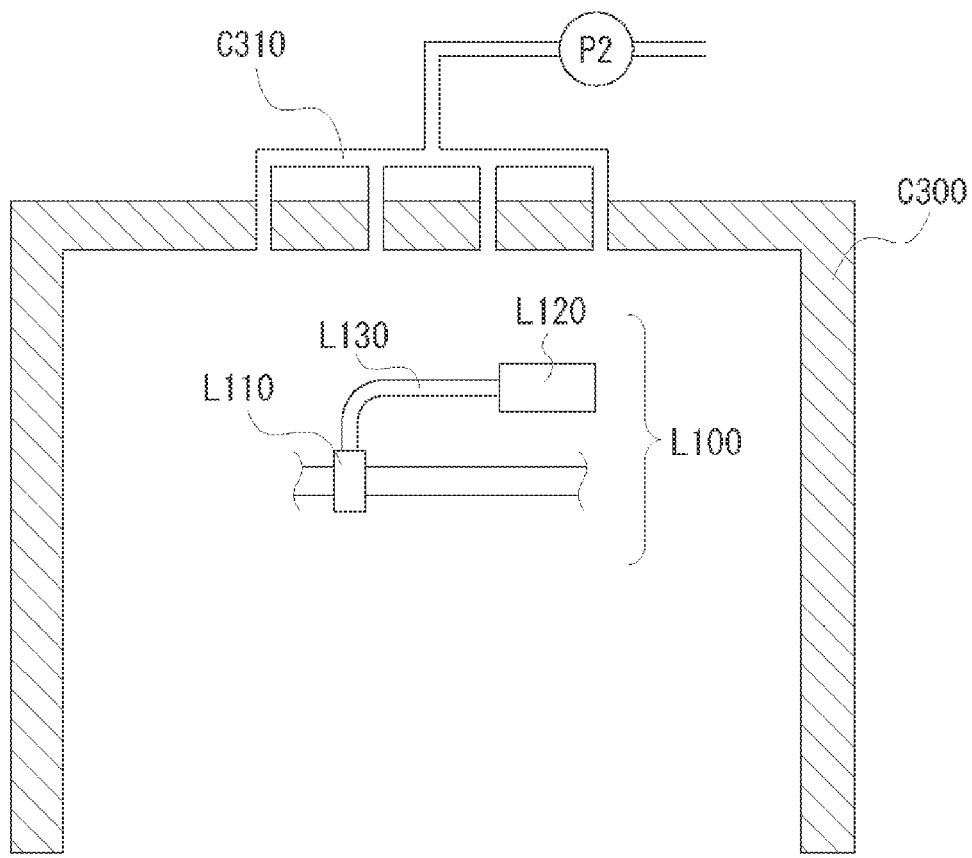
FIGS. 3A and 3B illustrate a modification of the second exemplary embodiment of the present invention.
Figure 3A:
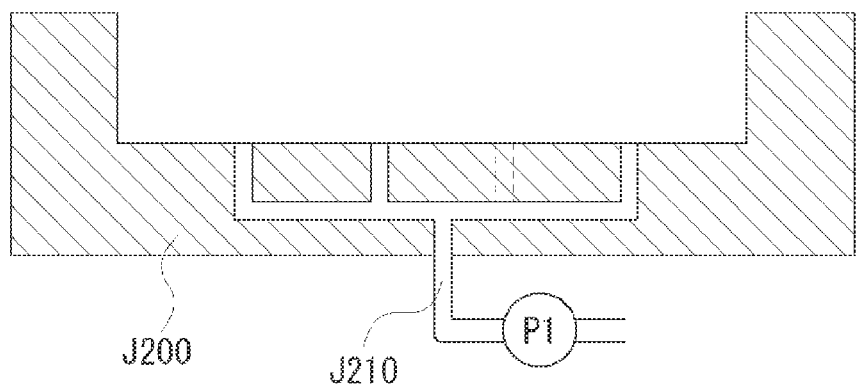
Figure 3B:
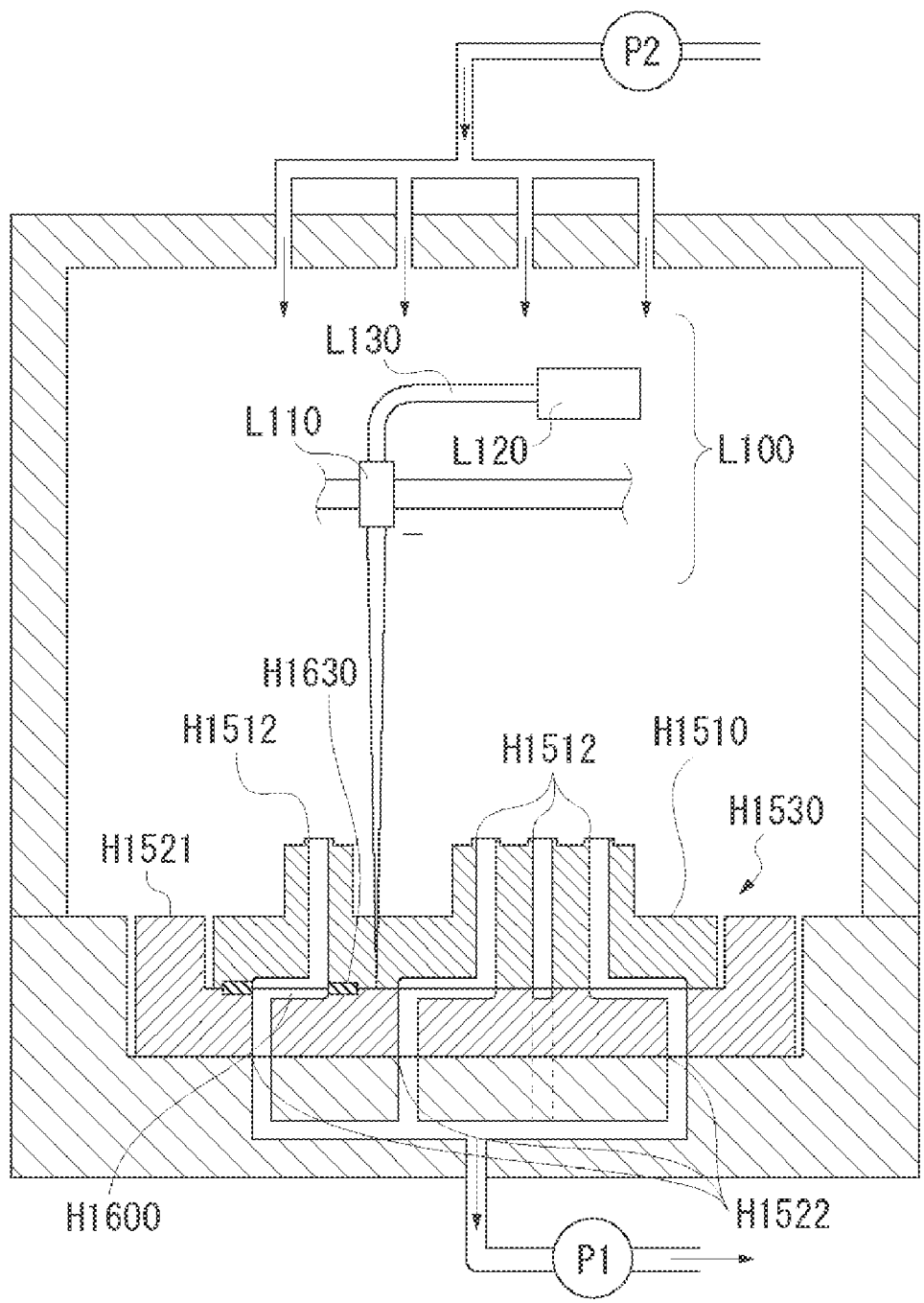

When the cover C300 has a light-shielding function, the laser beam emitted from the irradiation lens L110 during the welding can be prevented from leaking to the outside. Therefore, it is unnecessary to further provide a light-shielding cover for light shield. When the configuration in the first exemplary embodiment and the configuration in the second exemplary embodiment are both applied as illustrated in FIGS. 3A and 3B, the contamination of the irradiation lens L110 can further be reduced.

A third exemplary embodiment according to the present invention will next be described.

Figure 4A:
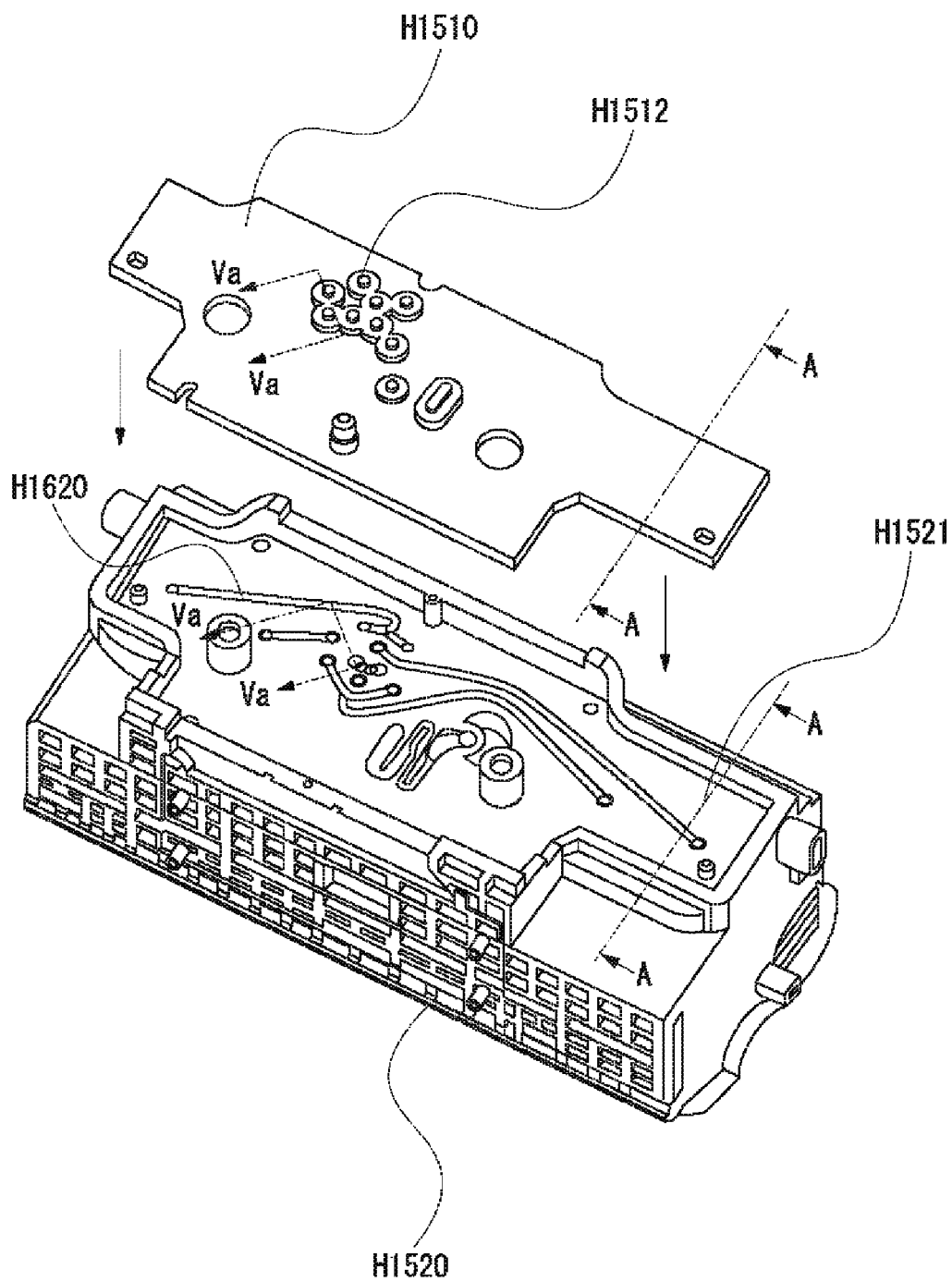
FIGS. 4A to 4C illustrate a third exemplary embodiment of the present invention.
Figure 4B:
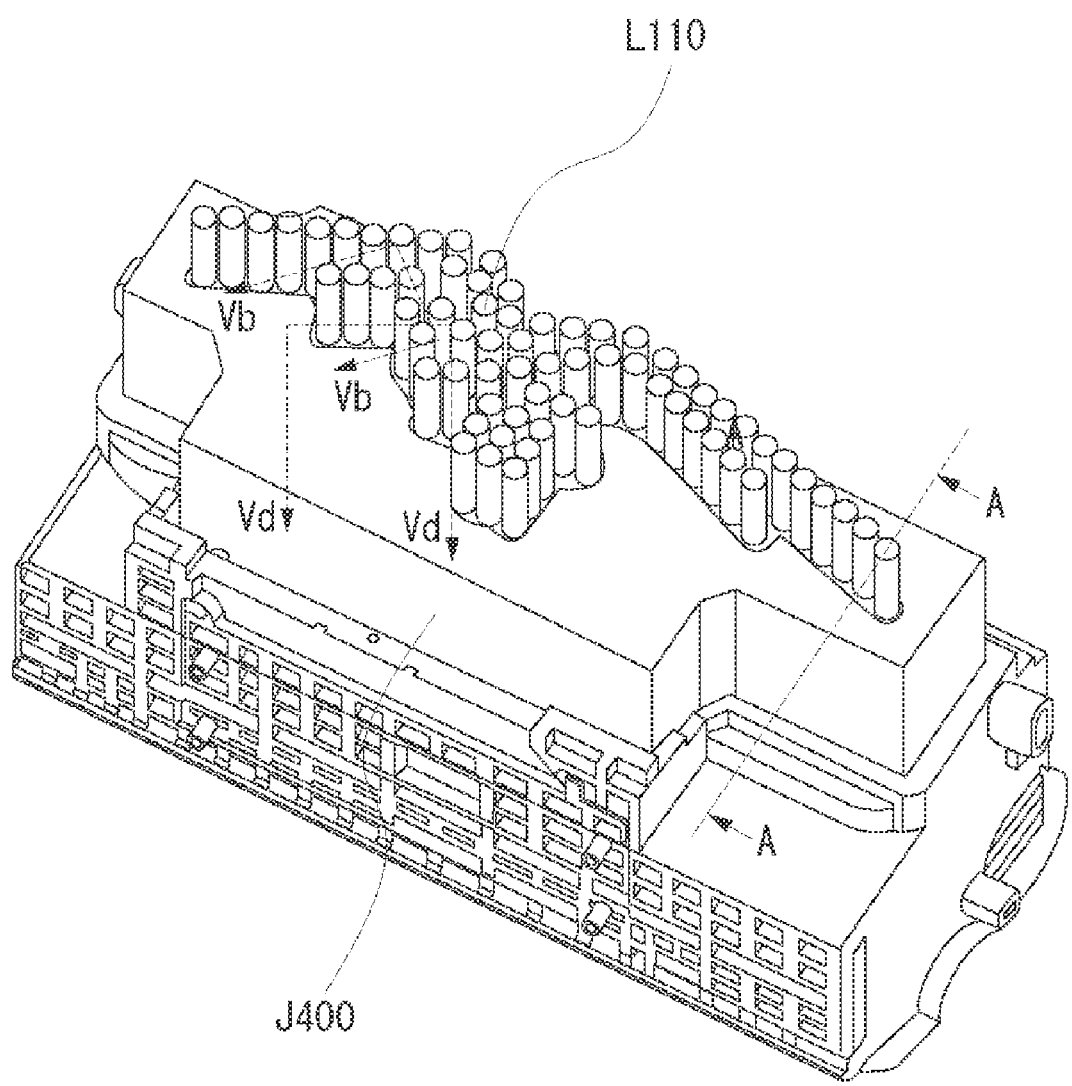
Figure 4C:
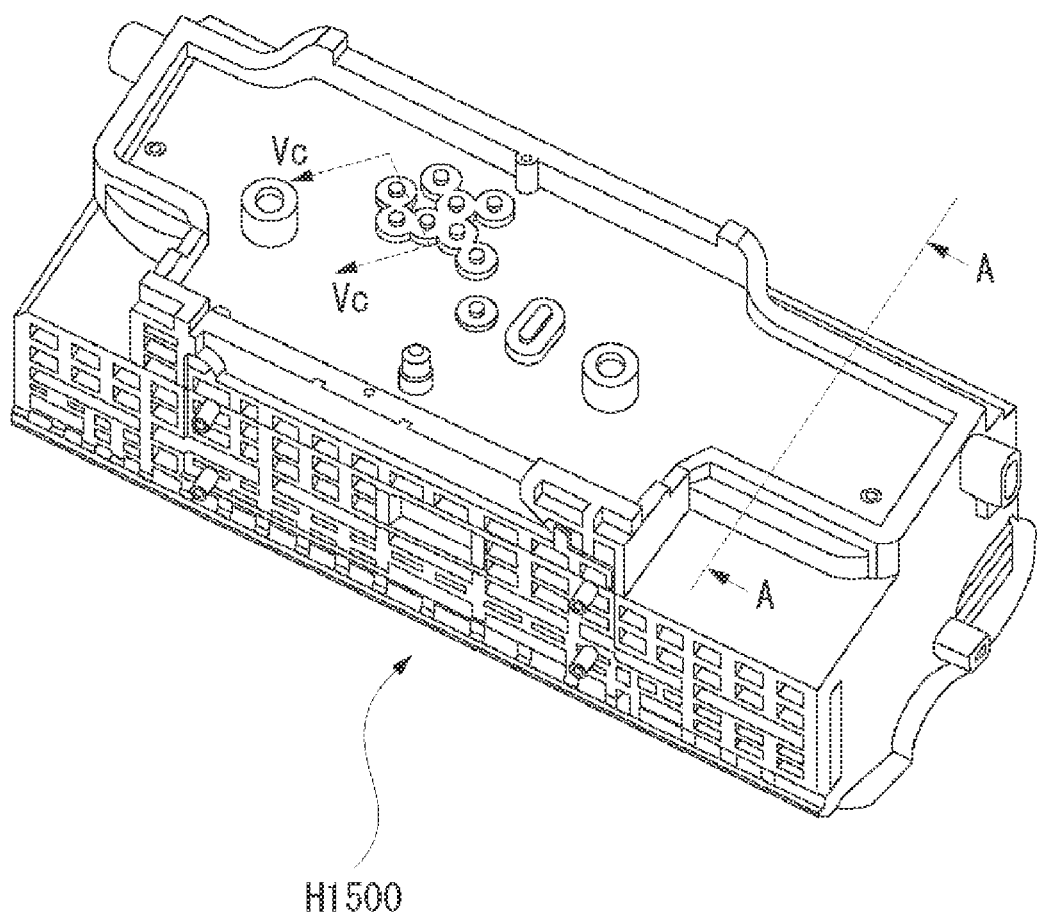

The first and second exemplary embodiments adopt, as the laser welding method, a scanning system in which the laser beam is emitted to perform scanning along the area that is to be welded. The third exemplary embodiment employs a system in which the irradiation lenses L110 are arranged to correspond to areas to be welded, and the areas to be welded all together are simultaneously irradiated with the laser beam as illustrated in FIGS. 4A to 4C. The description of the components similar to those in the above described embodiments will not be repeated.

FIGS. 4A to 4C are perspective views illustrating the process of mounting the first supply path member H1510, which is the transparent member, to the tank holder H1520 including the second supply path member H1521, which is the absorptive member, formed integral therewith.

FIG. 4A illustrates a process of preparing and bringing the first supply path member 1510 and the second supply path member H1521 formed integral with the tank holder H1520 into contact with each other.

FIG. 4B illustrates the welding process in which a holding jig J400 holds the first supply path member H1510 to bring the first supply path member and the second supply path member into close contact with each other, and the laser beam is emitted from the irradiation lens L110 via the first supply path member. On the holding jig J400, the irradiation lenses L110 are arranged corresponding to the area H1600S around the ink supply path. With this structure, the areas to be welded at one time can be simultaneously irradiated with the laser beam.

FIG. 4C illustrates the tank holder unit H1500 to which the first supply path member H1510 and the second supply path member H1521 are welded.

Figure 5A:
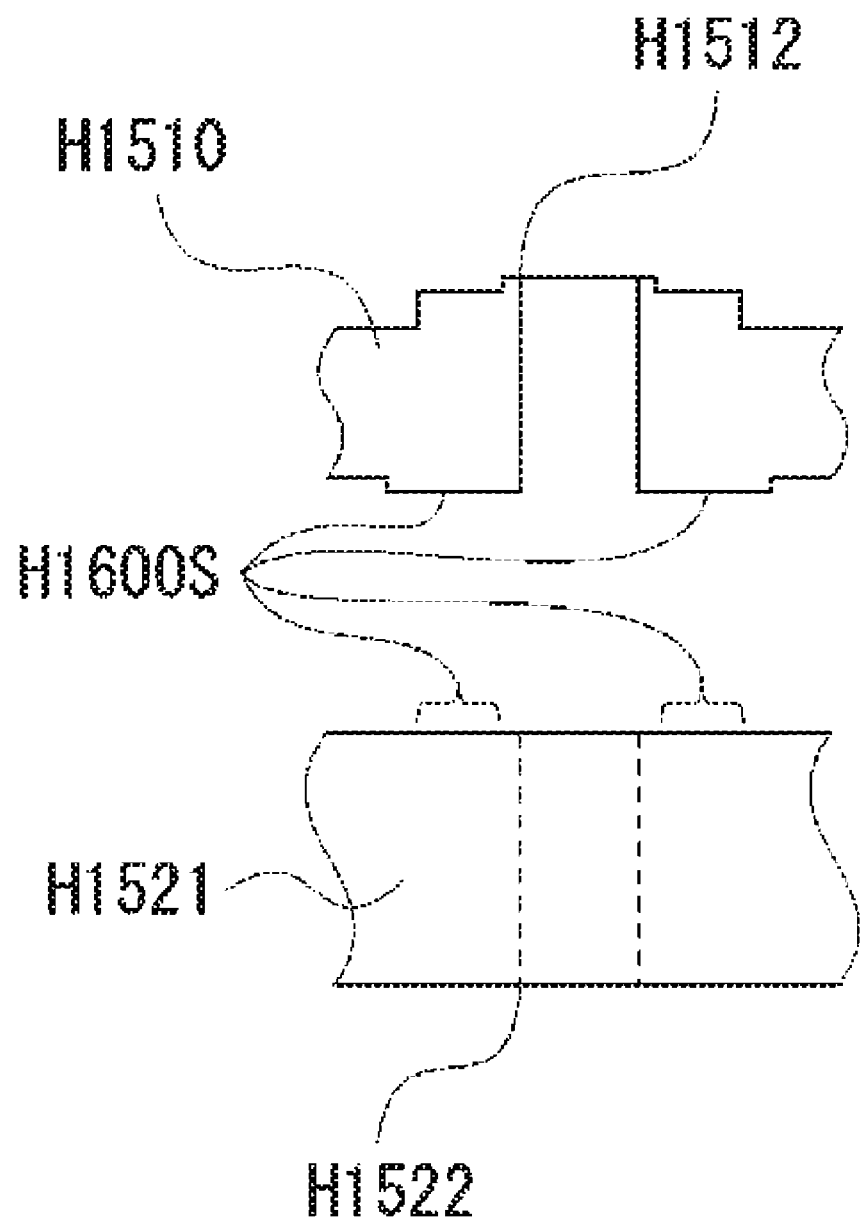
FIGS. 5A to 5D illustrate the third exemplary embodiment of the present invention.
Figure 5B:
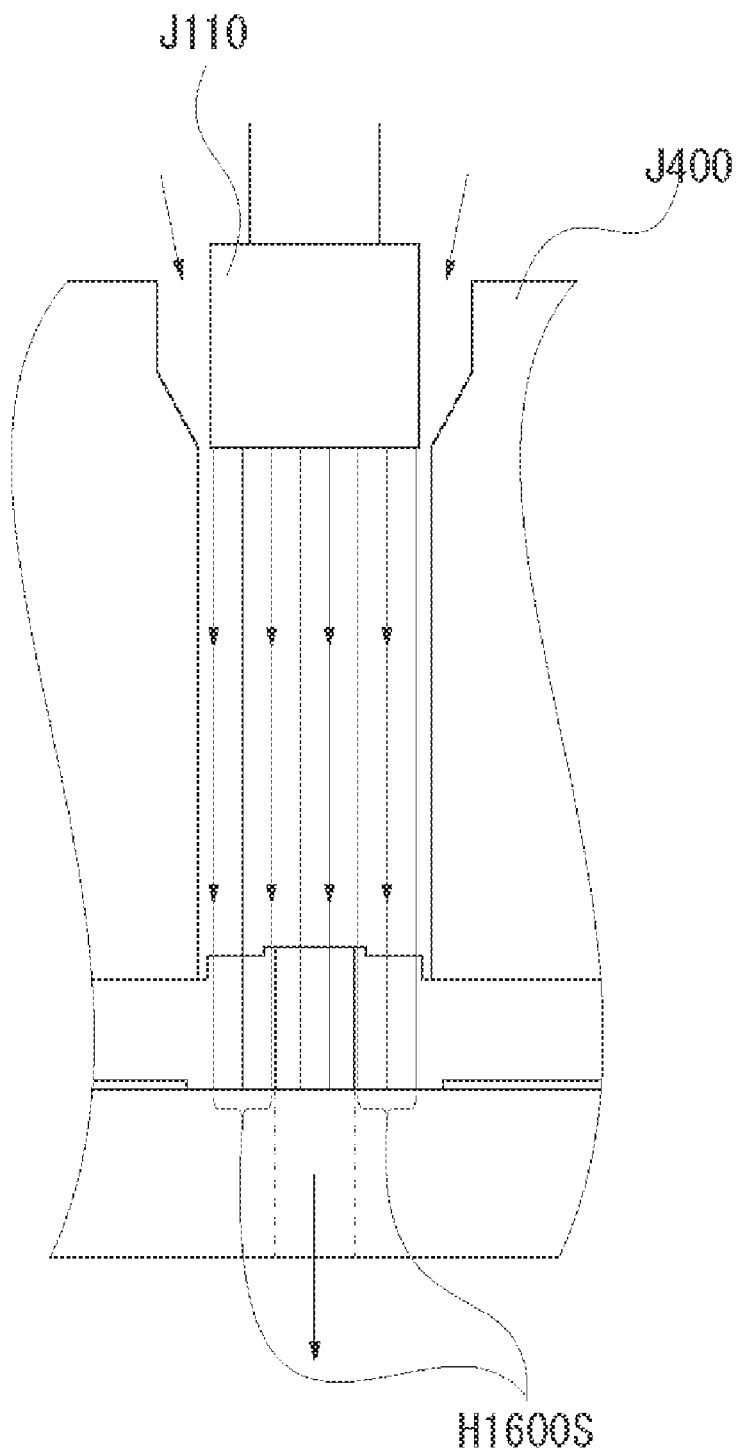
Figure 5C:
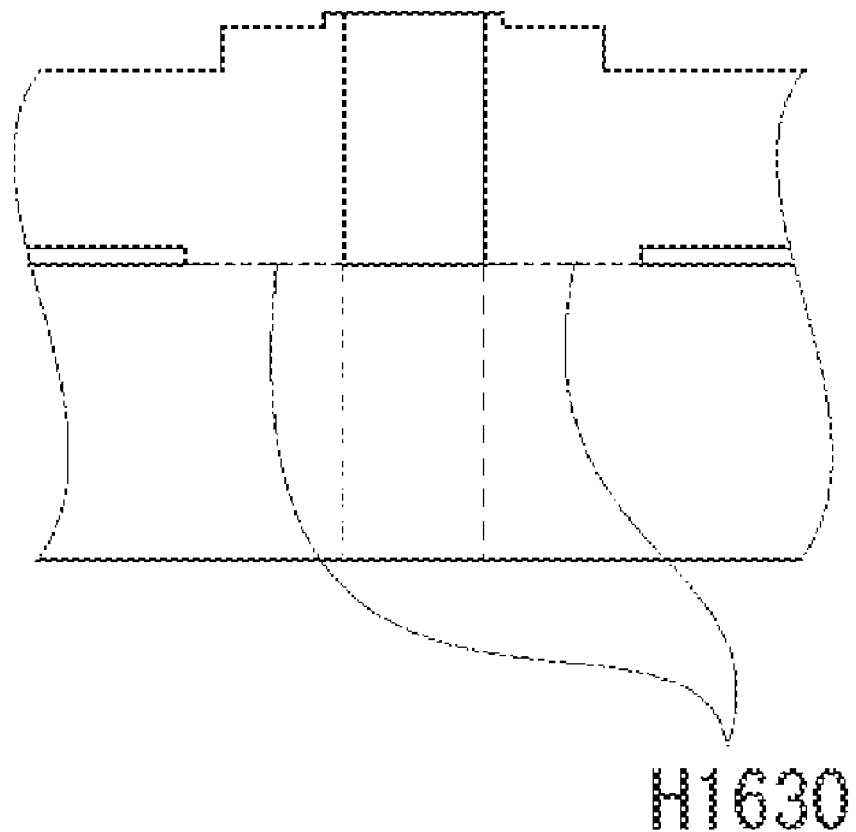
Figure 5D:
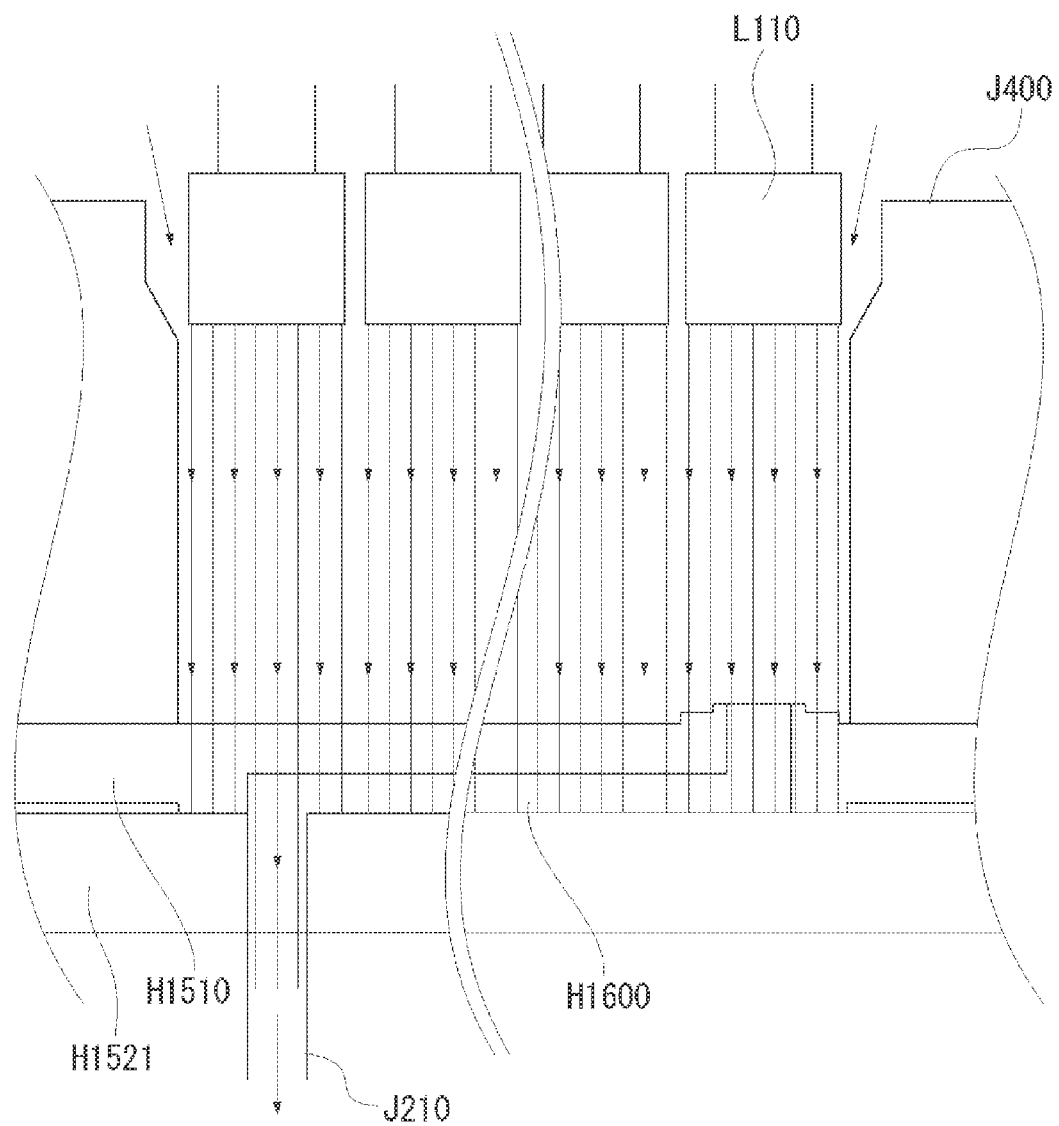

FIGS. 5A to 5C are sectional views taken along a line Va-Va in FIG. 4A, a line Vb-Vb in FIG. 4B, and a line Vc-Vc in FIG. 4C respectively. FIGS. 4A to 4C correspond respectively to FIGS. 5A to 5C. FIG. 5D is a sectional view taken along a line Vd-Vd in FIG. 4B. The specific structures of the first supply path member and the second supply path member will be described with reference to FIGS. 4A to 4C and FIGS. 5A to 5D.

The second supply path section H1620 and the ink supply path H1600 illustrated in FIG. 4A and FIGS. 5A, 5B, and 5D have a width of about 1.0 mm. A width of the area H1600S around the ink supply path, which becomes the welded portion H1630 (FIG. 5C), is about 1.0 mm, so that the ink supply path H1600 has a microstructure.

When the ink supply path H1600 having the microstructure is formed by a simultaneous irradiation system, it is difficult to irradiate only to the H1600S around the ink supply path, which becomes the welded portion, with the laser beam and the ink supply path H1600 is also irradiated with the laser beam. Accordingly, the irradiation lens L110 and the first opening H1512 that is formed on the first supply path member irradiated with the laser beam are covered by the jig J400 during the irradiation with the laser beam, as illustrated in FIGS. 5B and 5D. Consequently, the irradiation lens L110 is likely to be contaminated compared to the configurations in the first exemplary embodiment and the second exemplary embodiment, when the gas generated from the welded portion H1630 is leaked out from the first opening H1512.

An amount of the gas generated from the welded portion per a unit time during the irradiation with the laser beam is greater in the simultaneous irradiation system in which irradiation with the laser beam is simultaneously performed than in the case in which the irradiation with the laser beam is performed by the scan system. Therefore, the problem of contamination of the irradiation lens L110 by the gas generated from the welded portion is more significant.

The inside of the holding jig J400 has a shape of covering the surrounding of the first supply path section and the second supply path section as illustrated in FIGS. 5B and 5D, and the laser beam is reflected on the inside of the holding jig J400 and the contact portion is irradiated therewith. Therefore, when the inside of the holding jig J400 is contaminated by the gas generated from the welded portion H1630, a reflection ratio to the laser beam in the holding jig J400 reduces which might attenuate the irradiation energy of the laser beam.

In the present exemplary embodiment, the gas in the ink supply path H1600 is exhausted from the second opening H1522 with using the pump P1 (not illustrated), like the first exemplary embodiment, during the welding process illustrated in FIGS. 5B and 5D, so that the atmospheric pressure in the first opening can be made higher than the atmospheric pressure in the second opening. Accordingly, the airflow is generated in the ink supply path H1600 from the first opening toward the second opening and can prevent the gas generated from the welded portion H1630 from leaking out from the first opening H1512.

As in the first exemplary embodiment, the gas may be exhausted from the second opening at least throughout the welding process. If the gas is exhausted before and after the welding process, the contamination of the irradiation lens L110 can further be reduced. In addition to the reduction in the contamination of the irradiation lens L110, the contamination of the inside of the holding jig J400 can also be reduced.

The present exemplary embodiment may be combined with not only the first exemplary embodiment but also an exemplary embodiment described below.

The present exemplary embodiment describes the simultaneous irradiation system as one example of the case in which the area around the ink supply path and the ink supply path communicating with the first opening are irradiated with the laser beam. However, the present exemplary embodiment is applicable to the case in which a surface is scanned and irradiated with a line laser beam, so that the area around the ink supply path, which is a portion to be welded, and the portion other than the welded portion such as the ink supply path communicating with the first opening are irradiated with the laser beam.

In the present exemplary embodiment, the first supply path member H1510 and the second supply path member H1521 are in contact with each other only at the area H1600S around the ink supply path which is irradiated with the laser beam, while the members H1510 and H1521 are not in contact with each other at the portion which is not irradiated with the laser beam, as illustrated in FIG. 5B.

Since the contact portion and the non-contact portion are formed as described above, pressure is concentrated on only the contact portion (the area around the ink supply path H1600S), when the first supply path member H1510 and the second supply path member H1521 are brought into contact with each other, so that adhesiveness at the contact portion can be enhanced.

When the area H1600S around the ink supply path is irradiated with the laser beam as illustrated in FIG. 5B, the dye or pigment contained in the second supply path member H1521 (absorptive member) generates heat to fuse the resin. The heat generated at this time is transmitted to the first supply path member H1510. The transmitted heat also fuses the first supply path member H1510. In this case, the adhesiveness is high at the area H1600S around the ink supply path, and hence, the fusing heat is efficiently transmitted. Therefore, the welded portion H1630 illustrated in FIG. 5C becomes rigid.

A fourth exemplary embodiment according to the present invention will next be described.

In the above described exemplary embodiments, the ink supply path H1600 is used as the exhaust path of the gas. In the present exemplary embodiment, the gas is exhausted with using an exhaust path provided separate from the ink supply path H1600. The description of the components similar to those in the above described embodiments will not be repeated.

Figure 8A:
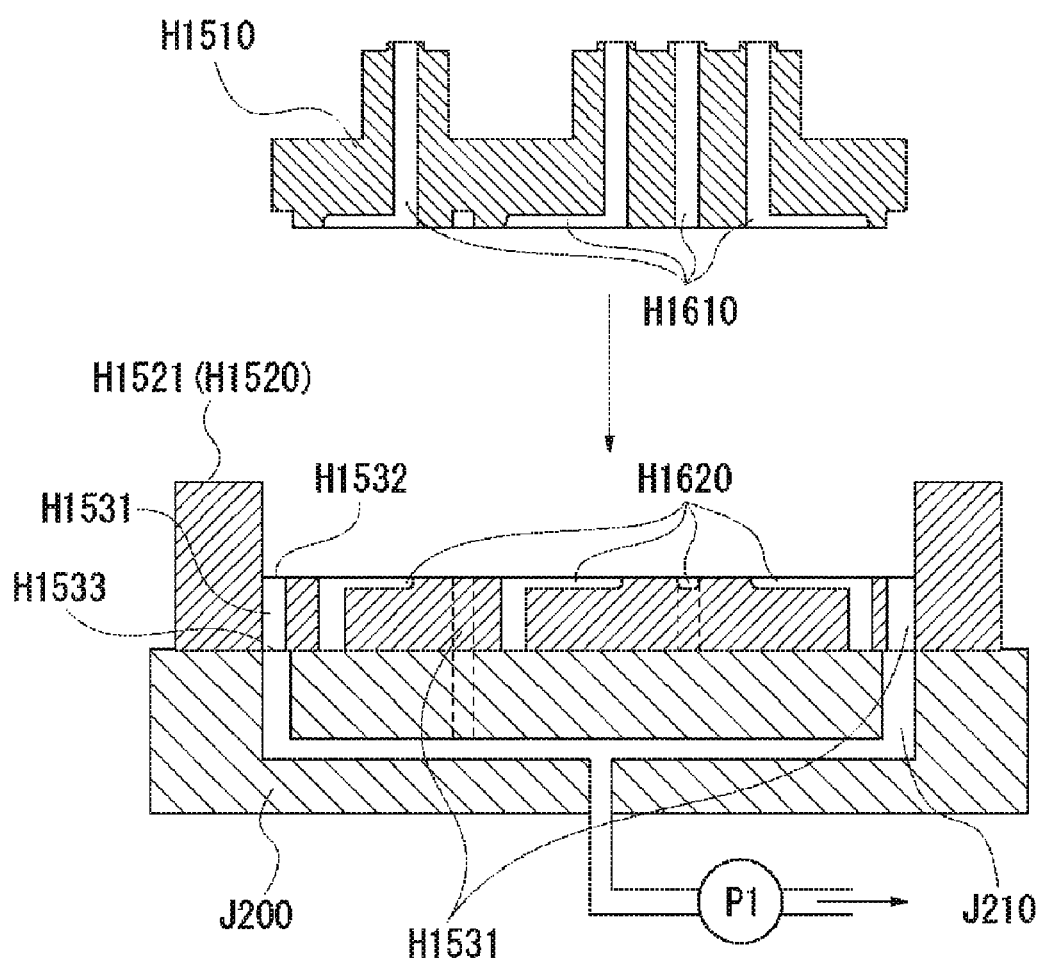
FIGS. 8A and 8B illustrate a fourth exemplary embodiment of the present invention.
Figure 8B:
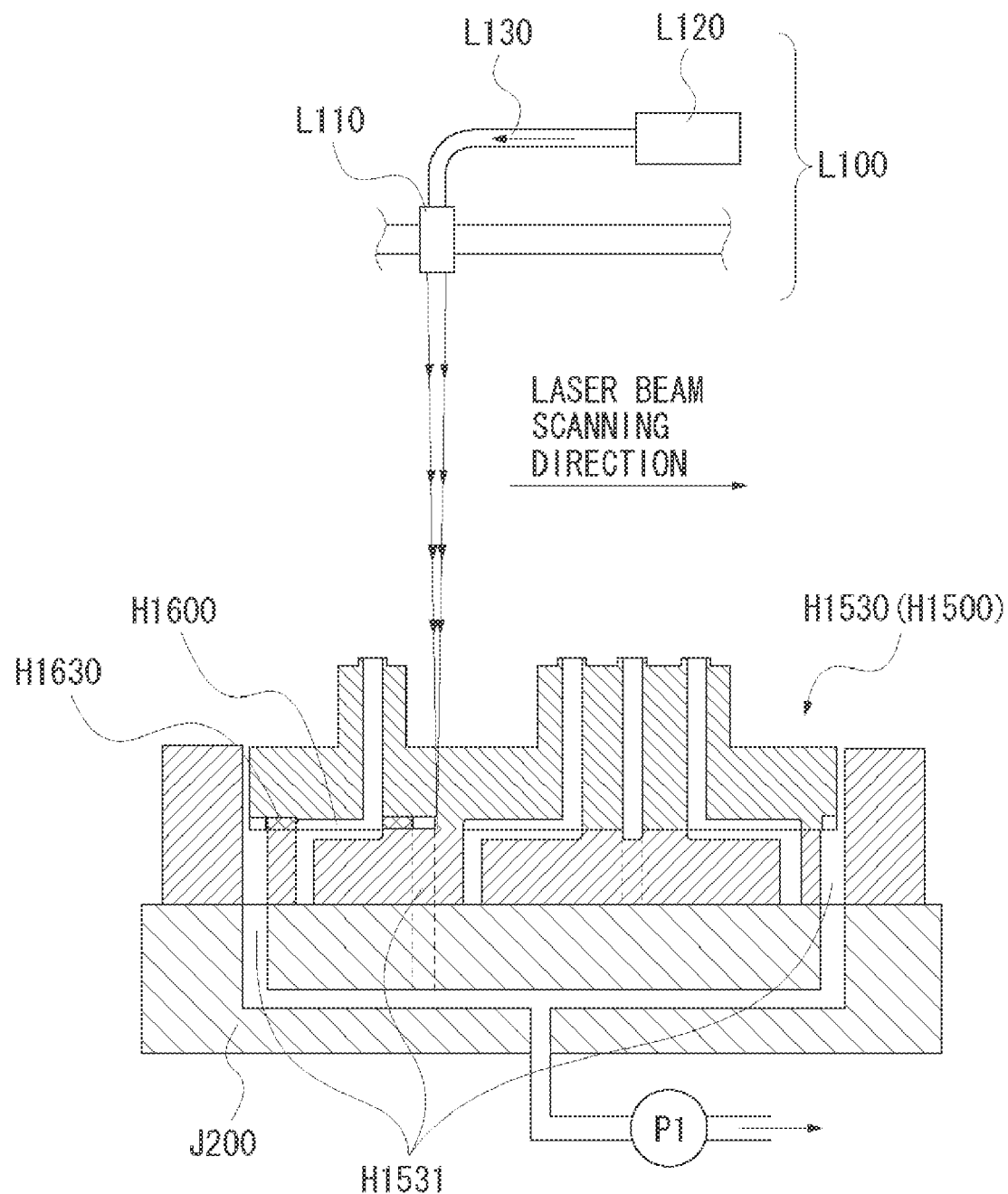

FIGS. 8A and 8B are sectional views illustrating a process of forming the supply path member H1530 (H1500) by welding the first supply path member H1510 having the first supply path section H1610 formed thereto and the second supply path member H1521 (H1520) having the second supply path section H1620 formed thereto.

FIG. 8A illustrates a process in which the first supply path member H1510 and the second supply path member H1521 are prepared, and both members are brought into contact with each other with the first supply path section H1610 and the second supply path section H1620 facing inward. FIG. 8B illustrates the welding process in which the first supply path member and the second supply path member are welded by the irradiation with the laser beam.

In the present exemplary embodiment, an exhaust path H1531 communicating with the welded portion H1630 (FIG. 8B) where the first supply path member and the second supply path member are welded is provided to the second supply path member H1521. The exhaust path H1531 does not communicate with the ink supply path H1600 illustrated in FIG. 8B. A first opening H1532 at one end of the exhaust path H1531 is formed on the second supply path member to communicate with a space formed between the first supply path member and the second supply path member. Since the first opening H1532 is formed at an area in the vicinity of the welded portion H1630, the gas generated from the welded portion H1630 can promptly be exhausted via the exhaust path H1531.

A second opening H1533 that is another end of the exhaust path H1531 is formed on an outer surface of the second supply path member H1521 (supply path member H1530). The "outer surface of the supply path member" in the present specification means the surface exposed to the outside with the first supply path member and the second supply path member being welded to each other. More specifically, the surface where the first supply path member and the second supply path member face each other with a predetermined gap is excluded from the outer surface of the supply path member.

The gas in the gap between the first supply path member and the second supply path member can be exhausted by the exhaust pipe J210 from the second opening H1533 that is one end of the exhaust path H1531 formed on the second supply path member. One end of the exhaust pipe J210 is connected to the pump P1 serving as a pressure-reducing unit.

The gas in the gap between the first supply path member and the second supply path member can be exhausted via the exhaust pipe J210 and the exhaust path H1531 throughout at least the welding process illustrated in FIG. 8B.

As described above, the gas is exhausted with using the exhaust path H1531 formed on the first supply path member and the second supply path member throughout at least the welding process. This structure can prevent the gas generated from the welded portion H1630 from leaking out from the gap between the first supply path member and the second supply path member to direct toward the laser beam irradiation lens L110.

In the present exemplary embodiment, the exhaust path H1531 is provided in a direction same as a laser beam irradiation direction. However, the direction of the exhaust path H1531 is not particularly limited, as long as the exhaust path may be provided in such a manner that the gas can be exhausted from the welded portion H1630.

Figure 9A:
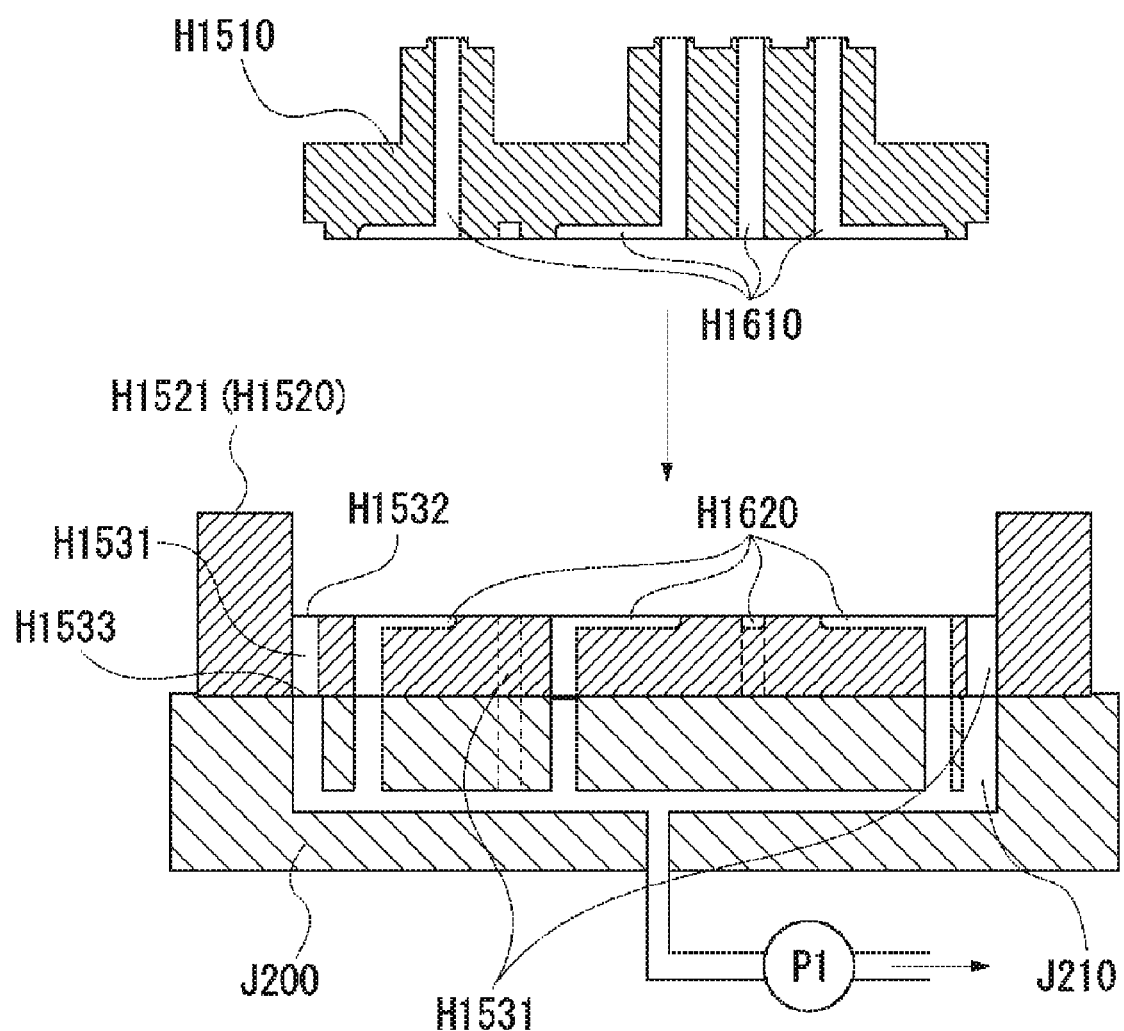
FIGS. 9A and 9B illustrate a modification of the fourth exemplary embodiment of the present invention.
Figure 9B:
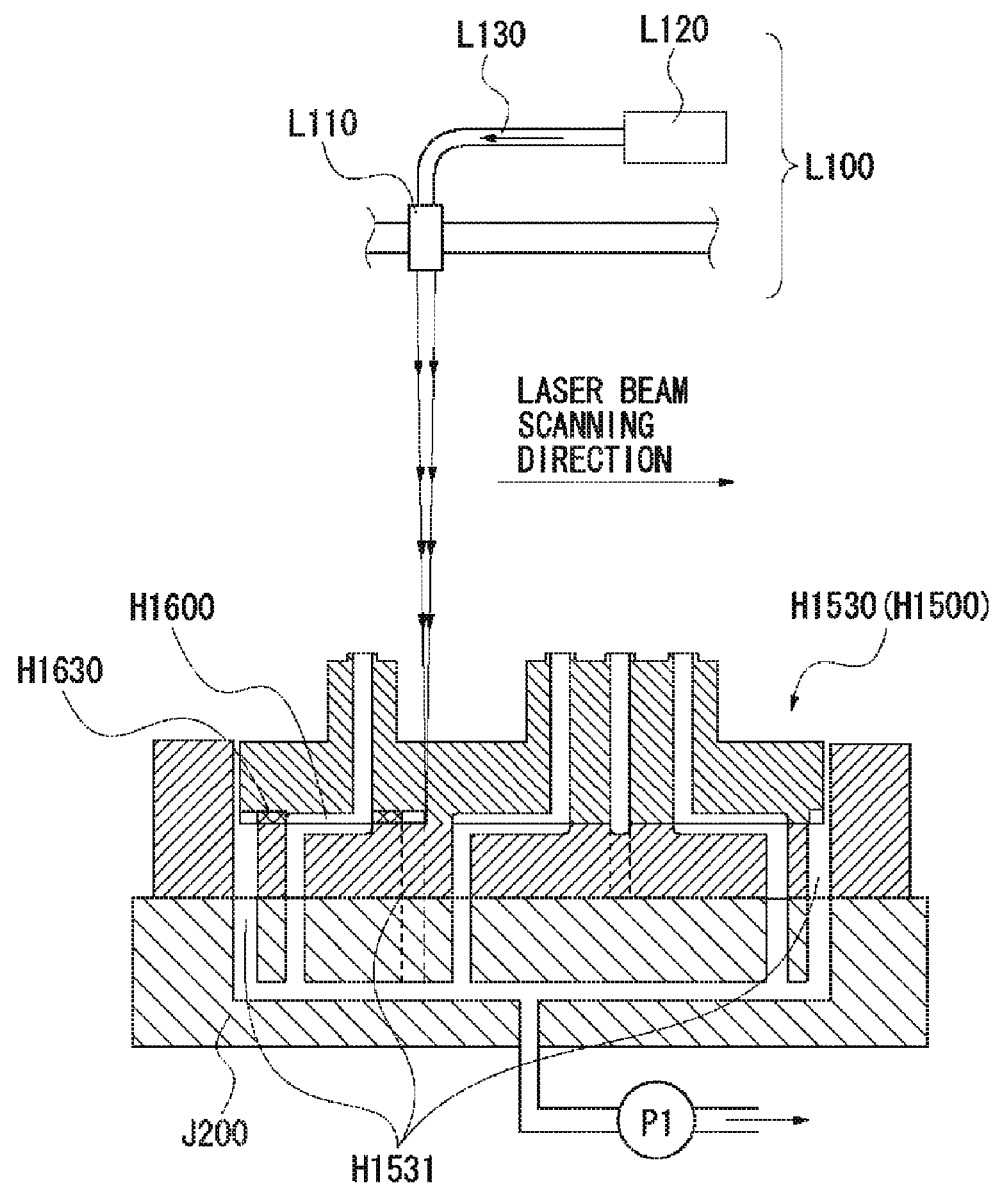

As illustrated in FIGS. 9A and 9B, both of the exhaust path H1531 and the supply path H1600, which are provided to the supply path member H1530, may be used as the exhaust path of the gas as in the present exemplary embodiment.

A fifth exemplary embodiment according to the present invention will next be described.

The fifth exemplary embodiment is characterized in that a space that is to become a retaining portion for retaining the gas generated from the welded portion is formed on the supply path member between the first supply path member and the second supply path member, in addition to the configuration of the fourth exemplary embodiment. Since the retaining portion is formed, the gas generated from the welded portion is retained in the retaining portion, even when the process of exhausting the gas is performed after the welding process. This configuration provides an effect that the gas is difficult to leak out. The description of the components similar to those in the above described embodiments will not be repeated.

The structure of the supply path member H1530 in the present exemplary embodiment will be described in detail with reference to FIGS. 10A, 10B and 11A to 11C. In the present exemplary embodiment, irradiation with the laser beam is performed by the simultaneous irradiation system described in the third exemplary embodiment, but the irradiation method of the laser beam is not limited thereto.

Figure 10A:
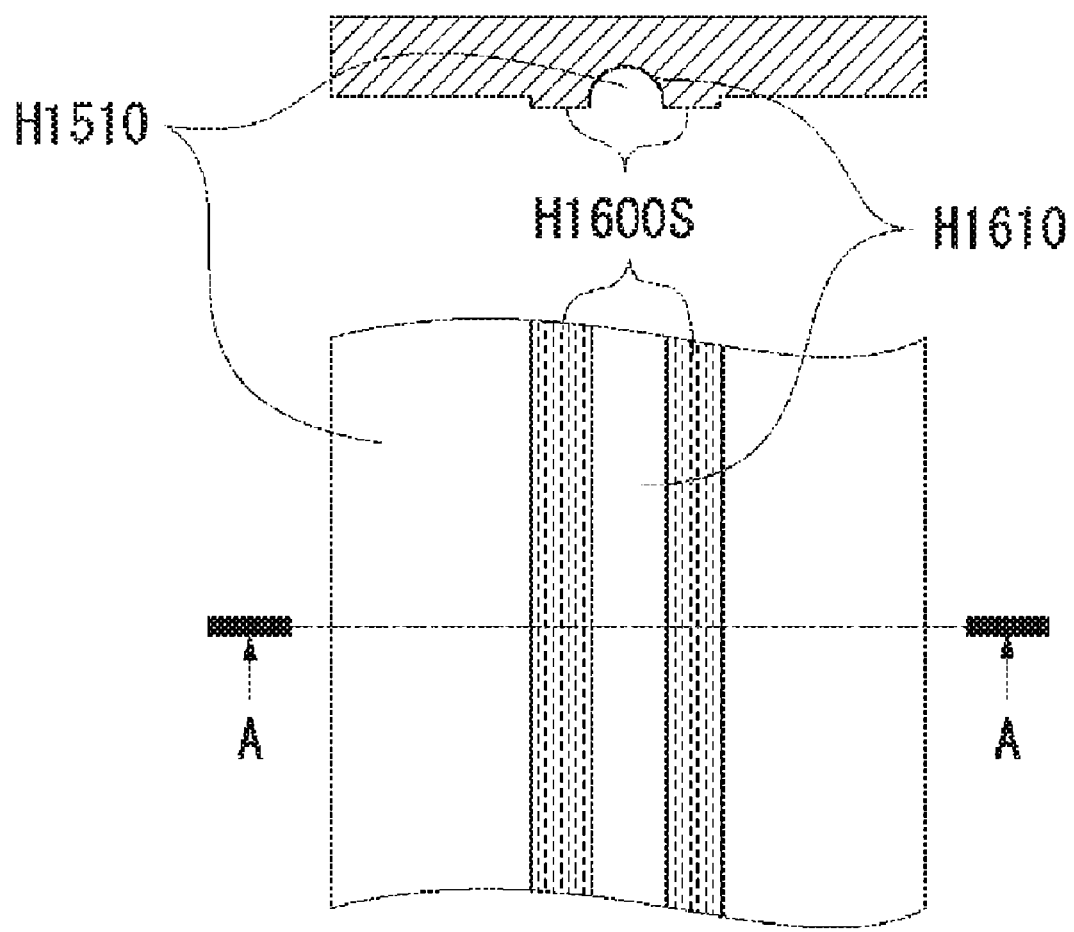
FIGS. 10A and 10B illustrate a fifth exemplary embodiment of the present invention.
Figure 10B:
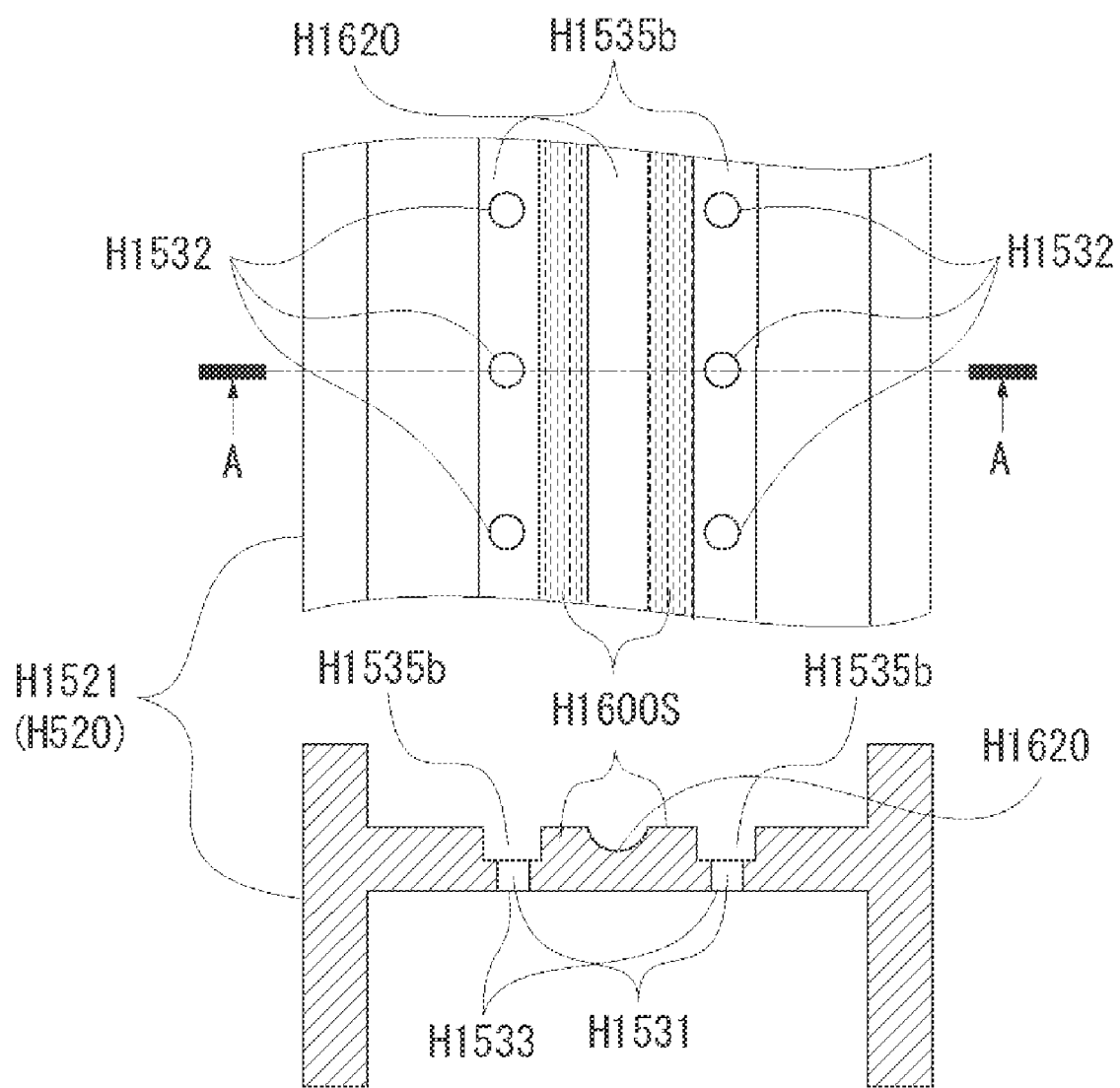

An A-A cross-sectional line in FIG. 10A corresponds to an A-A cross-sectional line in FIGS. 4A to 4C. FIG. 10A is a cross sectional view taken along the line A-A and a bottom view of the first supply path member H1510. FIG. 10B is a top view and a cross sectional view taken along the line A-A of the second supply path member H1521.

Figure 11A:
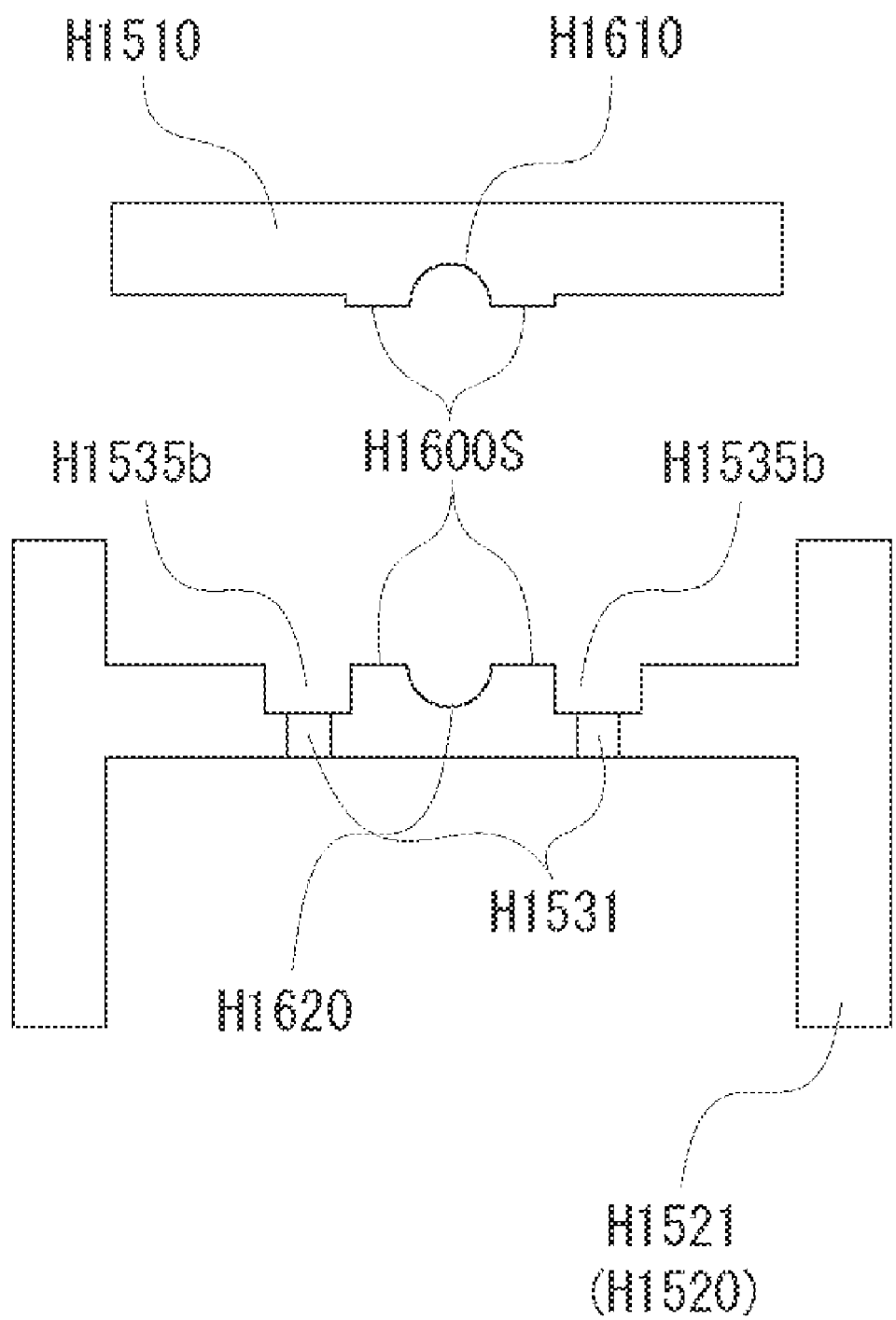
FIGS. 11A to 11C illustrate the fifth exemplary embodiment of the present invention.
Figure 11B:
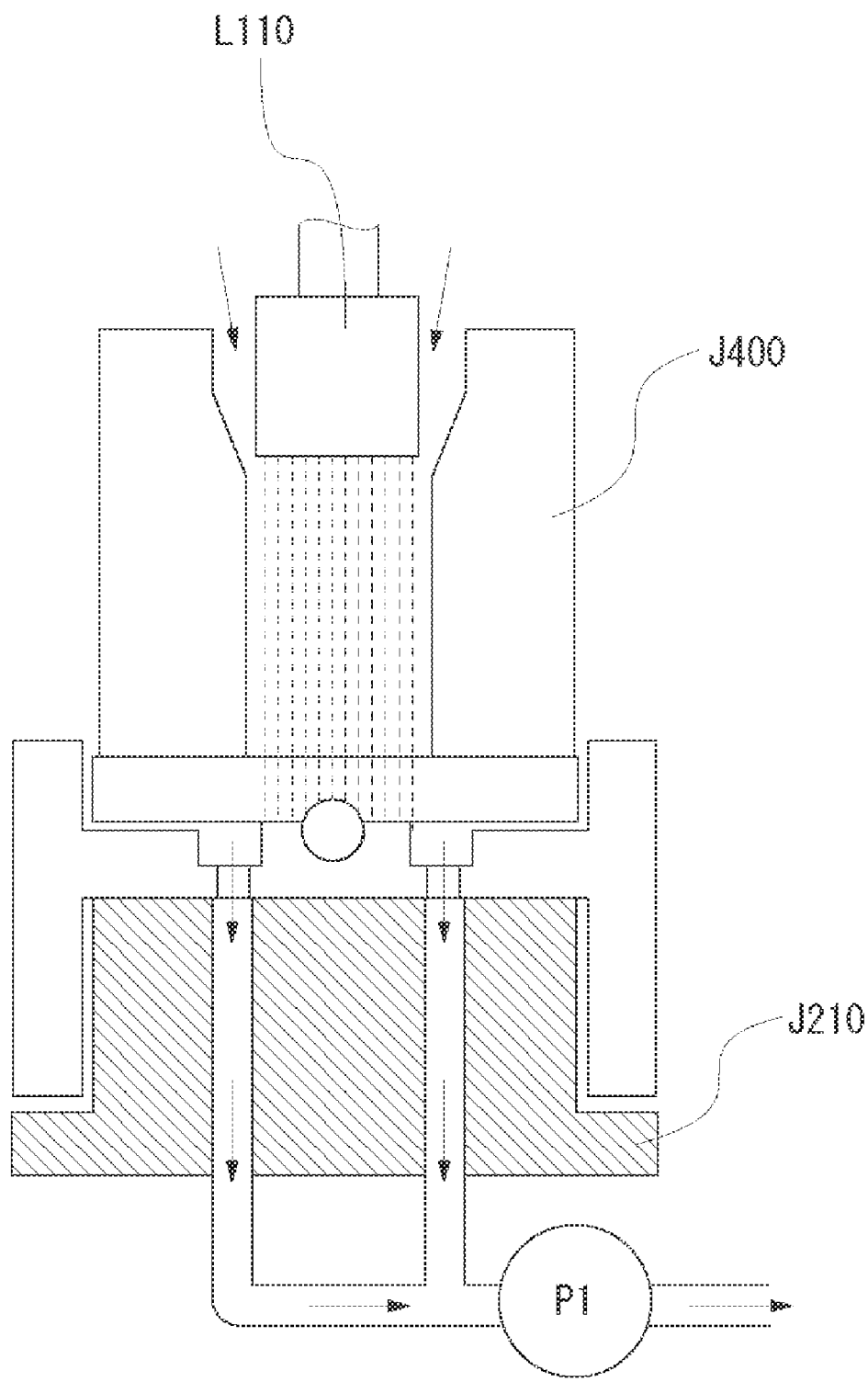
Figure 11C:
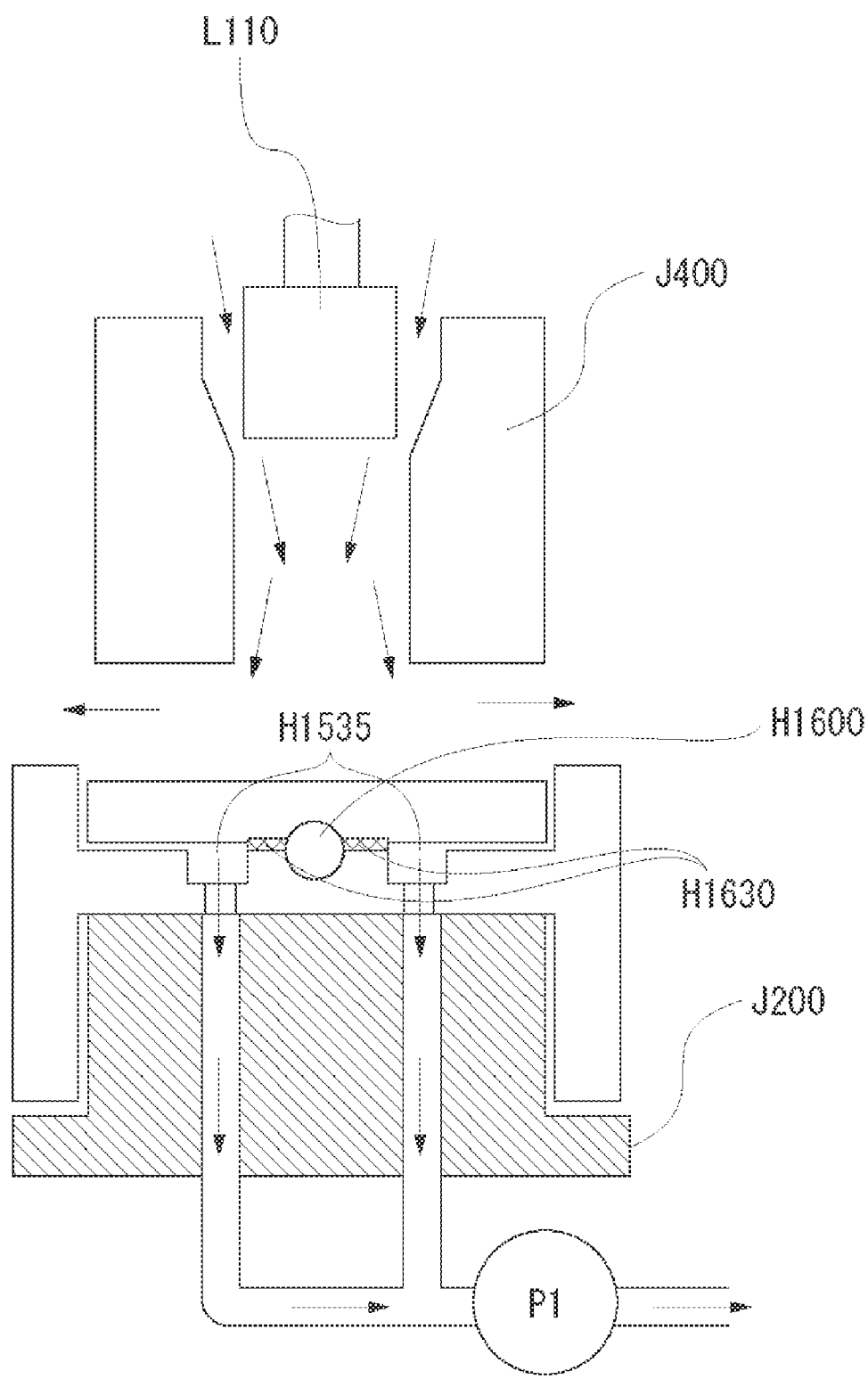
Figure 12A:
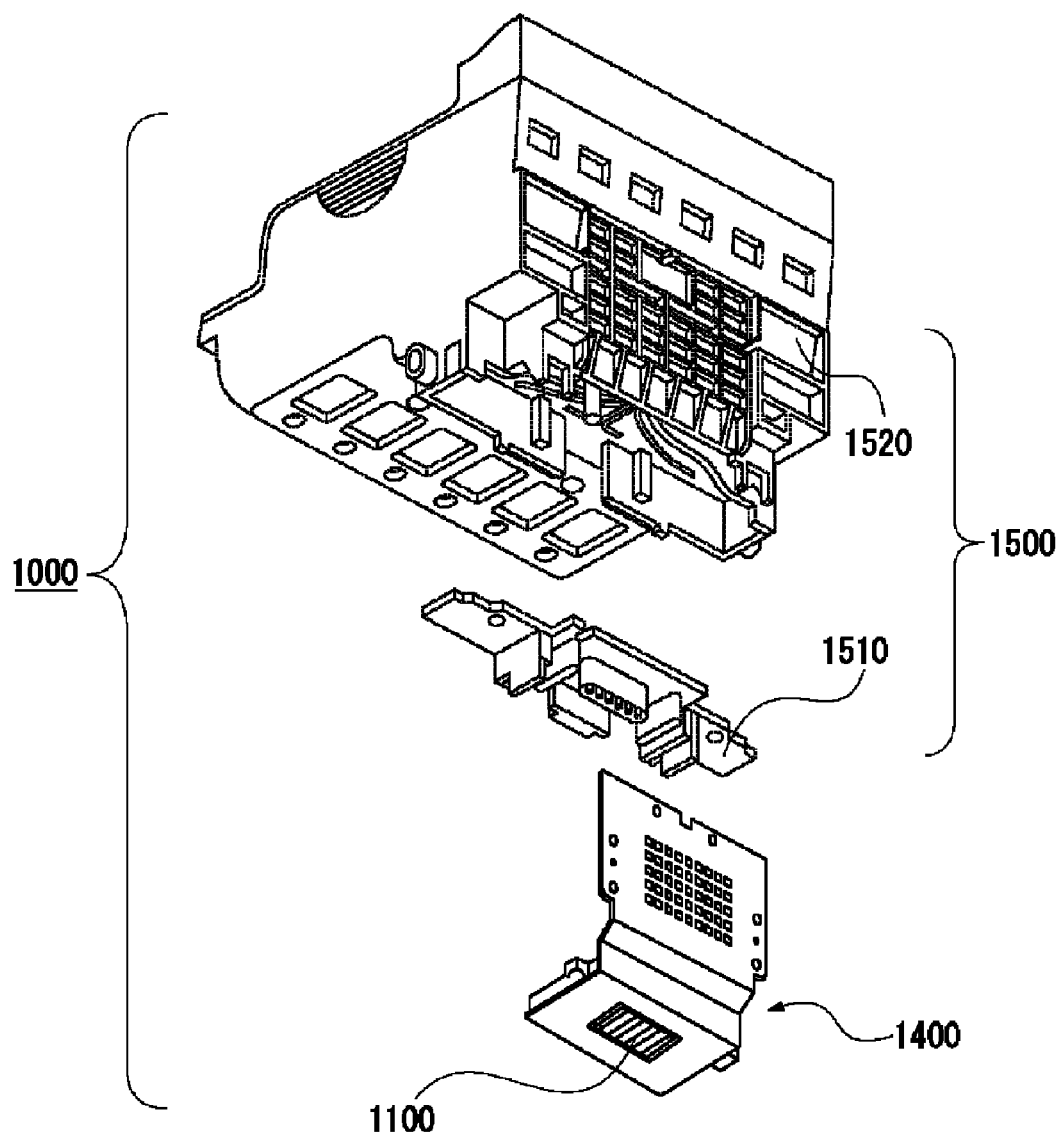
FIGS. 12A to 12C illustrate a structure of a conventional ink jet recording head.
Figure 12B:
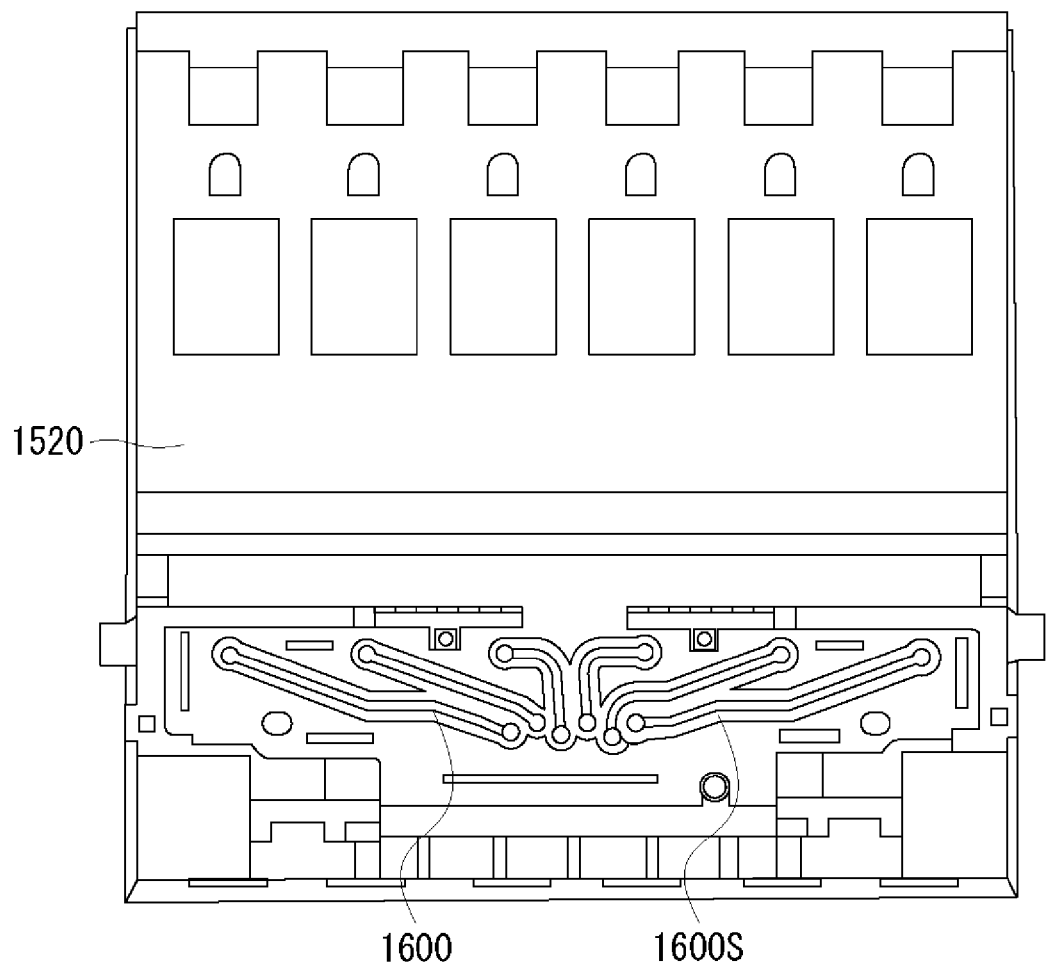
Figure 12C:
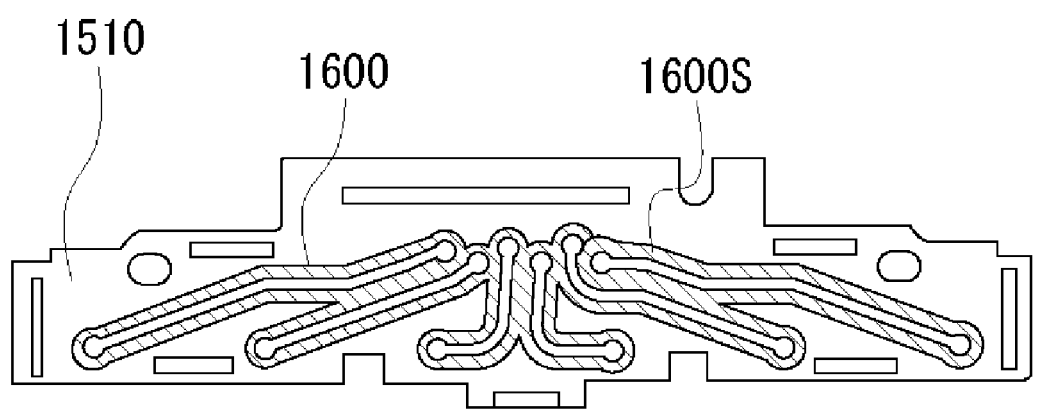
Figure 13A:
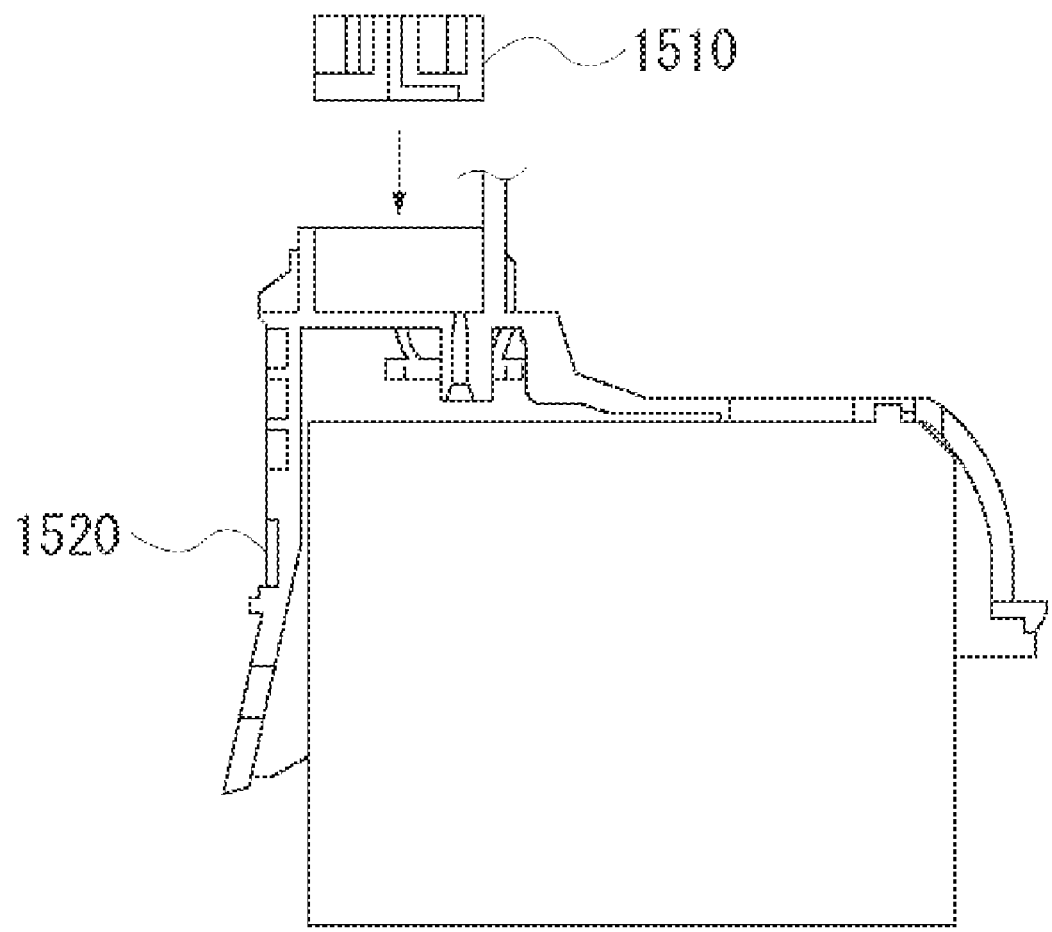
FIGS. 13A to 13C illustrate a laser welding method.
Figure 13B:
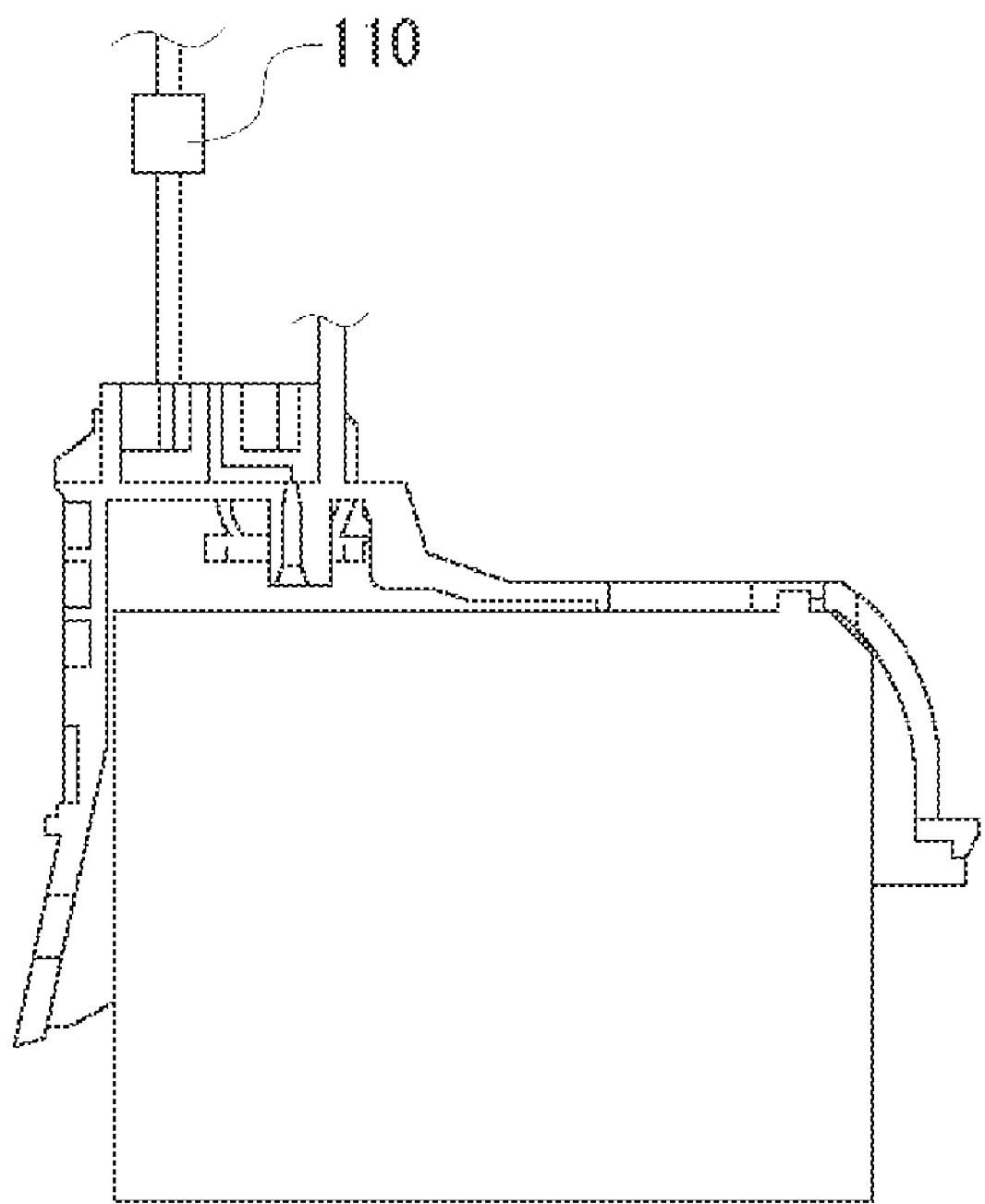
Figure 13C:
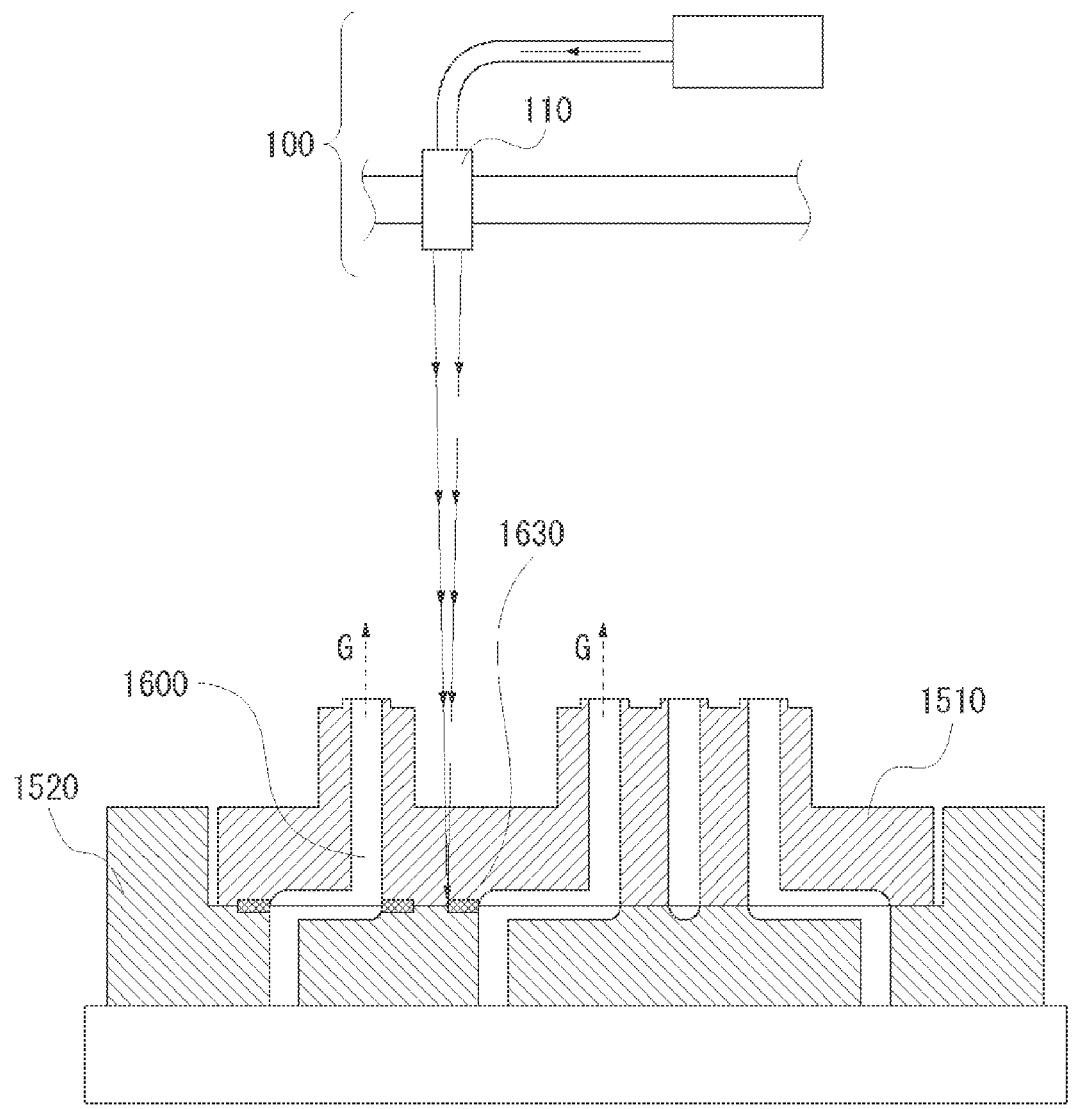

FIGS. 11A to 11C illustrate a process of forming the supply path member H1530 by the irradiation with the laser beam in the present exemplary embodiment. FIGS. 11A to 11C respectively illustrate the sectional views taken along the line A-A in FIGS. 4A to 4C. FIG. 11A illustrates a process of bringing the first supply path member H1510 and the second supply path member H1521 into contact with each other. FIG. 11B illustrates a process of welding with the laser beam. FIG. 11C illustrates the tank holder unit H1500 (supply path member H1530) formed by welding both members.

A groove having a semicircular sectional shape is formed on the first supply path member H1510 illustrated in FIG. 10A as the first supply path section H1610 that forms a part of the wall of the ink supply path H1600. The first supply path member H1510 and the second supply path member H1521 are welded at the area at both sides along the first supply path section H1610, i.e., at the area H1600S around the ink supply path (FIGS. 10A and 10B).

A groove having a semicircular sectional shape is formed on the second supply path member H1521 (tank holder unit H1520) illustrated in FIG. 10B as the second supply path section H1620 that forms a part of the wall of the ink supply path H1600. A groove H1535b that is to become the retaining portion H1535 (see FIGS. 11B and 11C) is formed on the second supply path member H1521 along the area H1600S around the ink supply path.

The groove to become the retaining portion is formed along the area H1600S, which is to become the welded portion H1630, around the ink supply path. The exhaust path formed on the supply path member H1530 is connected to the retaining portion H1535.

The exhaust path H1531 is formed on the second supply path member H1521. The exhaust path H1531 is connected to the groove H1535b to become the retaining portion. An opening H1533 at one end of the exhaust path H1531 is formed on the surface at the side where the second opening H1522 of the ink supply path illustrated in FIG. 6B is formed (i.e., the back side of the surface of the second supply path member where is irradiated with the laser beam).

Since the retaining portion H1535 is formed along the welded portion H1630 of the supply path member H1530 as illustrated in FIG. 10B, the gas generated from the welded portion H1630 can be easily retained therein when the gas is exhausted after the welding process. Further, since the retaining portion H1535 is provided at the area adjacent to the welded portion H1630, the gas can be exhausted to the outside of the supply path member H1530 through the exhaust path H1531 connected to the retaining portion H1535 while suppressing the leakage of the gas from the supply path member H1530.

With this structure, the gas generated and retained in the retaining portion during the welding process is difficult to diffuse to the outside of the supply path member. Therefore, even if the gas in the supply path member is exhausted after the welding process, the gas can efficiently be exhausted to the outside of the supply path member through the exhaust path H1531.

The present exemplary embodiment describes the configuration in which the retaining portion H1535 is provided to the first supply path member H1510. However, the retaining portion H1535 may be provided to the second supply path member H1521 or both supply path members.

As described in the first to fifth exemplary embodiments, the contamination of the irradiation lens can be reduced by applying the manufacturing method of the present invention. Accordingly, the present invention can provide a method for manufacturing a liquid discharge head in which an ink supply path can be formed by the stable irradiation with the laser beam.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-094103 filed Apr. 8, 2009 and No. 2009-094104 filed Apr. 8, 2009, which are hereby incorporated by reference herein in their entirety.

What is claimed is:

1. A method for manufacturing a liquid discharge head including a discharge port for discharging liquid, a supply path for supplying the liquid to the discharge port, a transparent member that has light transmittance for a laser beam, and an absorptive member that has absorptivity to the laser beam, and the transparent member and the absorptive member include supply path sections that become a part of a wall of the supply path, the method comprising:
   bringing the transparent member and the absorptive member into contact with each other in such a manner that a surface of the transparent member including the supply path section and a surface of the absorptive member including the supply path section are brought into contact with each other in the vicinity of the supply path sections;
   welding the transparent member and the absorptive member by irradiating the contact portion where both members are in contact with each other with the laser beam via the transparent member; and
   exhausting gas from an exhaust path formed on the liquid discharge head in the vicinity of the contact portion at least throughout the welding process.

2. The method according to claim 1, further comprising starting the exhaust of the gas before the welding.

3. The method according to claim 1, further comprising completing the exhaust of the gas after the welding process.

4. The method according to claim 1, wherein the exhaust path communicates with an opening formed on the absorptive member to exhaust the gas from the opening.

5. The method according to claim 4, further comprising:
   simultaneously irradiating the contact portion with the laser beam when the transparent member and the absorptive member are welded.

6. The method according to claim 4, further comprising covering the transparent member and the absorptive member with a covering member before the welding,
   wherein the covering member includes an inlet portion for introducing the gas into the member, and an exhaust portion for exhausting the gas from the member that communicates with the opening, and
   the gas is introduced from the inlet portion into the member to exhaust the gas from the exhaust portion.

7. The method according to claim 1, wherein the exhaust path is the supply path.

8. The method according to claim 1, wherein the exhaust path is separately provided from the supply path on the liquid discharge head.

9. The method according to claim 8, further comprising exhausting the gas from the exhaust path, which is separately provided from the supply path, and from the supply path.

10. The method according to claim 1, further comprising sucking the gas from the exhaust path to exhaust the gas.

11. The method according to claim 1, wherein the gas includes gas generated during the welding process.

* * * * *